United States Patent
Merino Vazquez et al.

(10) Patent No.: US 10,547,650 B2
(45) Date of Patent: *Jan. 28, 2020

(54) METHODS AND APPARATUSES FOR ASSIGNING TO A TERMINAL DEVICE A SERVICE SERVER IN A TELECOMMUNICATIONS SYSTEM

(71) Applicant: Telefonaktiebolaget LM Ericsson (publ), Stockholm (SE)

(72) Inventors: Emiliano Merino Vazquez, Madrid (ES); Francisca Bejarano Garcia, Madrid (ES); Ingo Berk, Madrid (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/975,346

(22) Filed: May 9, 2018

(65) Prior Publication Data

US 2018/0262538 A1    Sep. 13, 2018

Related U.S. Application Data

(63) Continuation of application No. 15/039,551, filed as application No. PCT/EP2013/075149 on Nov. 29, 2013, now Pat. No. 9,992,239.

(51) Int. Cl.
*H04L 29/06* (2006.01)
*H04L 29/14* (2006.01)

(52) U.S. Cl.
CPC ...... *H04L 65/1069* (2013.01); *H04L 65/1016* (2013.01); *H04L 65/1073* (2013.01); *H04L 65/80* (2013.01); *H04L 69/40* (2013.01)

(58) Field of Classification Search
CPC ............. H04L 65/1016; H04L 65/1069; H04L 65/1073; H04L 65/80; H04L 69/40
See application file for complete search history.

(56) References Cited

U.S. PATENT DOCUMENTS 9,681,295 B2    6/2017    Le Rouzic et al.
9,736,192 B2    8/2017    Noldus et al.
(Continued)

FOREIGN PATENT DOCUMENTS

EP    2 075 956 A1    7/2009
EP    2 234 364 A1    9/2010

OTHER PUBLICATIONS

International Search Report and Written Opinion dated Jul. 30, 2014 for International Application No. PCT/EP2013/075149, International Filing Date Nov. 29, 2013 consisting of 13 pages.
(Continued)

*Primary Examiner* — Stephen J Clawson
(74) *Attorney, Agent, or Firm* — Christopher & Weisberg, P.A.

(57) ABSTRACT

A method for assigning to a terminal device (UE) a service server (SS) carried out by an IS, by any of the SSs, and by the UDB in a cooperative/corresponding manner. A "first reallocation (IS/SS/UDB) procedure" and a "second reallocation (IS/SS/UDB) procedure" are correspondingly performed within the IS, the SS and the UDB. The first reallocation procedure allows, via IS/SS/UDB processing and interactions, storing by the UDB, in relationship with at least one of the user identifiers of a UE, a mark indicating that the UE has been assigned to a replacement SS to substitute another SS that has failed. The second reallocation procedure allows, also via IS/SS/UDB processing and interactions, utilization of the mark to trigger a new SS reallocation of the UE to a SS when the UE sends a subsequent registration message.

20 Claims, 16 Drawing Sheets

Method in a IS

(56) References Cited

U.S. PATENT DOCUMENTS

| | | |
|---|---|---|
| 9,756,087 B2 | 9/2017 | Noldus |
| 2003/0108002 A1 | 6/2003 | Chaney et al. |
| 2006/0120362 A1 | 6/2006 | Westman et al. |
| 2006/0149812 A1* | 7/2006 | Lin .................. H04W 8/12 709/203 |
| 2007/0189215 A1 | 8/2007 | Wu et al. |
| 2007/0287454 A1* | 12/2007 | Zhu .................. H04W 8/10 455/435.1 |
| 2008/0020789 A1* | 1/2008 | Yan .................. H04L 63/08 455/466 |
| 2012/0096529 A1* | 4/2012 | Bournelle .......... H04W 12/06 726/7 |
| 2012/0134323 A1 | 5/2012 | Perkuhn et al. |
| 2012/0166621 A1 | 6/2012 | Sharma et al. |

OTHER PUBLICATIONS

3GPP TS 23.380 V11.1.0 (Dec. 2012) 3rd Generation Partnership Project; Technical Specification Group Core Network and Terminals; IMS Restoration Procedures (Release 11), Dec. 21, 2012 consisting of 17 pages.

3GPP TS 29.229 V12.0.0 (Jun. 2013) 3rd Generation Partnership Project; Technical Specification Group Core Network and Terminals; Cx and Dx Interfaces Based on the Diameter Protocol; Protocol Details (Release 12), Jun. 25, 2013 consisting of 37 pages.

3GPP TS 24.229 V12.2.0 (Sep. 2013) 3rd Generation Partnership Project; Technical Specification Group Core Network and Terminals; IP Multimedia Call Control Protocol Based on Session Initiation Protocol (SIP) and Session Description Protocol (SDP); Stage 3 (Release 12), Sep. 20, 2013 consisting of 776 pages.

* cited by examiner

METHODS AND APPARATUSES FOR ASSIGNING TO A TERMINAL DEVICE A SERVICE SERVER IN A TELECOMMUNICATIONS SYSTEM

CROSS-REFERENCE TO RELATED APPLICATIONS

This application is a Continuation of U.S. application Ser. No. 15/039,551 filed on May 26, 2016, which is a Submission Under 35 U.S.C. § 371 for U.S. National Stage Patent Application of International Application Number: PCT/EP2013/075149, filed Nov. 29, 2013 entitled "METHODS AND APPARATUSES FOR ASSIGNING TO A TERMINAL DEVICE A SERVICE SERVER IN A TELECOMMUNICATIONS SYSTEM," the entireties of both of which are incorporated herein by reference.

TECHNICAL FIELD

The present invention relates to methods for assigning to a terminal device, UE, a service server, SS, in a telecommunications system that comprises: a plurality of SSs, at least one database server, UDB, and at least one interrogating server, IS. The invention also relates to apparatus for participating in such methods, and to computer programs therefor.

BACKGROUND

Modern telecommunications systems are characterized, among other features, by allowing terminal devices to attach and further communicate to/through it via different types of access network (e.g. including wired and wireless access networks), as well as to allow the terminal devices to change their current access dynamically as they move. The modern telecommunications systems are also characterized in that they also support a wide variety of terminal devices (including, not only traditional telephone terminals, but also self-operated terminals), and a plurality of different communication services (including, not only voice communications, but also voice, video, data transfer services, and combinations thereof). For example, the terminal device connectable to a modern telecommunications system can be a human-operated device, such as: a mobile or fixed phone, a laptop or a desktop computer, a gaming device, an e-book reader, etc; as well as a self-operated terminal device (usually called as machine-to-machine, M2M, communications device), such as a device configured to measure a certain parameter (e.g. temperature, humidity, electrical voltage, etc) and to establish a communication session through the telecommunications system to transmit the measured parameter to another terminal device or to an application server accessible via said system.

For simplicity, and since the features of the present invention do not depend on characteristics of the terminal device (e.g. whether it is human-operated device, or whether it is self-operated/M2M device), the term "terminal device", or the abbreviation "UE", are used hereinafter indistinctly to refer to any kind of terminal device.

Due to scalability reasons, telecommunications systems use to distribute the assignation of UEs along a plurality of available service servers, SS. Each SS of the plurality is a kind of server configured to control communication sessions originated by a certain UE (i.e. initially requested from the UE), and communication sessions addressed to the UE (i.e. initially requested by other UE, or application server, and intended to be terminated by said UE). In particular, the SS that is assigned to a UE is configured to receive, process, and further route, messages originated by the UE and/or messages addressed to the UE that relate to communication sessions originated by the UE and/or addressed to the UE, and which are established between the UE and another party accessible via the telecommunications system (e.g. another UE, or a certain application server). For example, the SS assigned to a UE receives the message sent from the UE requesting to initiate a communication session with other party (e.g. another UE or an application server); then, it stores information that a communication is initiated by the UE, finds a path to get the other party, and forwards a message towards the other party to set up the communication session. Similarly, for example, the SS assigned to a UE can receive a message from other party addressed to the UE requesting to initiate a communication session with the UE; then, it stores information that a communication session is addressed to the UE (i.e. terminates in the UE), and forwards a message to the UE to set up the communication session.

A telecommunications system generally assigns a certain SS of the plurality to a particular UE according to static and/or dynamic factors. The static factors comprise, for example, information about the capabilities to support certain telecommunication feature by a certain SS, or information about a certain per-user or per-UE distribution (e.g. a certain set of UEs or users are preferably assigned to a certain SS). The dynamic factors comprise, for example, information for distributing UEs to SSs according to the respective UE location (e.g. UEs physically located on a certain geographical area are preferably assigned to certain SS). Data information about factors for distributing the assignation of a UE to be served by a SS is referred hereinafter also as "SS capabilities", and are commonly stored in relationship to identifiers of a UE and/or in relationship to identifiers of the user of a UE, (e.g. by a user database server, UDB, that will be later discussed). In short, the SS capabilities preferably comprise information usable by a server (e.g. an interrogating server, that will be later discussed) for selecting the most suitable SS to be assigned to a UE (e.g. upon a registration request received from the UE).

Due to the mobility of the UEs, and due that a UE can register and de-register in the telecommunications system, modern telecommunications systems usually incorporate a user database server (UDB). For security reasons, a UE already registered in the telecommunication system can (e.g. periodically) re-register in the system. The UDB is a kind of server where—among other data—information about the SS currently assigned to a registered UE is stored in relationship with, either or both: one or more identifiers of the UE (such as an identifier of a SIM card within the UE, an IMEI, etc), or in relationship with one or more identifiers specifically related with the user of the UE (such as a Session Initiation Protocol-Uniform Resource Identifier, SIP-URI, associated to said user and that can be used from various UEs). Both kind of identifiers are hereinafter referred as "user identifiers" for simplicity. The UDB can also store SS capabilities in respect to user identifiers of a UE; which can be usable to select one SS, among the plurality of SSs, when e.g. a UE that is not currently registered in the telecommunications system (e.g. it was turned-off) requests an initial registration in said system (e.g. it is turned-on later).

Because of the characteristics above, state of the art telecommunications systems used to incorporate also a kind of server—hereinafter referred to as "interrogating server", IS-configured to interrogate the UDB for obtaining, either, the SS currently assigned to a UE, or the corresponding SS capabilities. The IS is generally utilized when a UE request a registration in the system (either: initial registration, or re-registration), and when a message requesting to initiate a communication session addressed towards a UE is received. In short, an IS is a server configured to obtain from the UDB information about, either, the SS currently assigned to the UE or the SS that can be assigned to the UE, and to forward a received message originated or terminating in said UE to said SS. Accordingly, the IS is configured to query the UDB to obtain, either, the SS currently assigned to the concerned UE, or the corresponding SS capabilities stored by the UDB, which are utilized by the IS for selecting a SS among the plurality.

The FIG. 1 illustrates schematically a telecommunication system as discussed above, and will be used to explain some of the problems faced by the state of the art.

FIG. 1 shows a telecommunications system (10) comprising: a plurality of SS (SS1, SS-2, SS-3), a UDB and a IS. Various UEs (UE-a to UE-z—only UEs "a", "b" and "z" are shown for simplicity—) connect to the system 10 via one or more access networks (schematically represented by 101). In FIG. 1, the solid lines represent the path taken by the messages exchanged between the UEs and some of the nodes of the system 10, whilst dashed lines show inter-node communications. In particular, the UEs send and receive messages to the SSs, some of which are routed via the IS. The IS communicates with the UDB via an interface (102) that allows the IS to query the UDB for obtaining an identifier of the SS currently assigned to the UE or the corresponding SS capabilities for said UE (i.e. the SS capabilities that are stored by the UDB in respect of any of the user identifiers of the UE). Any of the SSs (SS1, SS-2, SS-3) is also configured to communicate via an interface (103) with the UDB. For example, the interface 103 allows a SS (e.g. SS-1) to indicate the UDB that it is the currently assigned SS to control communication sessions originated by a certain UE and/or addressed to said UE (e.g. UE-a), thereby asking the UDB to store, in relationship with a user identifier of certain UE, an identifier of a certain SS as the SS currently assigned to said UE (e.g.: an identifier of SS-1 is stored by the UDB in relationship with a user identifier of UE-a).

As an illustrating case, it can be assumed that at a certain time to, for example: SS-1 is the SS currently assigned to a first set of UEs (say, UE-a to UE-g), SS-2 is the SS currently assigned to a second set of UEs (say, UE-h to UE-o), and that SS-3 is the SS currently assigned to a third set of UEs (say, UE-p to UE-z). The UE/SS assignation example above can, for example, be determined by criteria about the best and/or most suitable SS to be assigned (e.g. per UE and/or per SS capabilities). The prior art envisages that, for example, in case of failure of SS-1, the UEs that were (e.g. at $t_0$) assigned to SS-1 can be reallocated to be served thereafter by another SS of the plurality (e.g. to SS-2). In this respect, the prior art envisages details so that the UDB gets updated from the SS that replaces another SS that failed in respect to a UE, so that an identifier of the—say—replacement SS is stored by the UDB as the SS currently assigned to the UE in substitution of the—say—failed SS. The prior art also envisages wherein the replacement SS is selected by an IS according to—at least—SS capabilities received from the UDB.

The prior art referred earlier comprises the 3GPP specification TS 23.380 V11.1.0. The document TS 23.380 discloses restoration procedures in a telecommunications system comprising an Internet Protocol Multimedia Subsystem, IMS; and, in particular, discloses procedures for replacing a SS (referred therein by as "Serving-Call Session Control Function", S-CSCF) when an IS (referred therein as "Interrogating-Call Session Control Function", I-CSCF) determines that a SS has failed (e.g.: TS 23.380, chapters 4.2.2 or 4.3.3).

Therefore—according to the prior art, and following the illustrating case referred above—, later, at a certain time $t_1$ ($t_1 > t_0$) the SS assignation per UE may have substantially changed and, for example, upon a failure of SS-1, the SS-2 has become—at time $t_1$—the currently SS assigned, not only to its initially assigned set of UEs (i.e. UE-h to UE-o, as in $t_0$), but also to the set of UEs that where earlier (i.e. in $t_0$) assigned to SS-1 (i.e. UE-a to UE-g).

The feature disclosed by the prior art of replacing a faulty SS by another available SS allows—no doubt—the UEs to be served in a seamless and reliable manner by a telecommunications system. However, replacing SSs currently assigned to UEs has an impact in the telecommunication system, inasmuch as some SSs can get close to its limiting capacity whilst other SSs can be underused.

It is desirable to provide solutions for assigning UEs to SSs that allow providing for seamlessly controlling by any of the available SS of communication sessions originated by the UE and/or addressed to the UEs whilst, at the same time, providing for evenly distribute UEs among the available/most suitable SSs.

SUMMARY

To meet or at least partially meet the above-mentioned goals, methods and apparatuses according to the invention are defined in the independent claims. Particular embodiments are defined in the dependent claims.

Aspects and embodiments of the invention envisage a telecommunication system comprising: a plurality of service servers, SS, configured to control communication sessions originated by a terminal device, UE, or addressed to the terminal device, at least one database server, UDB, configured to store in relationship one or more identifiers identifying the UE or identifying the user of the UE-herein referred to as "user identifiers"—, and either or both an identifier of the SS currently assigned to the UE or information about the capabilities required for an SS to be assigned to the UE-herein referred to as "SS capabilities"—, and at least one interrogating server, IS, configured to query the UDB to obtain at least one of an identifier of the SS currently assigned to an UE and said SS capabilities.

In a first aspect, the invention relates to a method for assigning to a terminal device (UE) a service server (SS) carried out: by an interrogating server, IS, by any of the service servers, SS, and by the database server, UDB, in a cooperative/corresponding manner.

The method comprises—correspondingly within the IS, the SS and the UDB-: a "first reallocation [IS/SS/UDB] procedure", and a "second reallocation [IS/SS/UDB] procedure". The first reallocation procedure allows—via IS/SS/UDB processing and interactions—storing by the UDB, in relationship with at least one of the user identifiers of a UE, a mark indicating that the UE has been assigned to a replacement SS to substitute another SS that has failed. The second reallocation procedure allows—also via IS/SS/UDB processing and interactions—to utilize said mark to allow/impel or—in other words—trigger a new SS reallocation of the UE to a SS when the UE sends a subsequent registration message.

In another aspect, the invention relates to apparatuses for participating in such a method, said apparatuses comprising:

an interrogating server, IS, a service server SS, and a database server, UDB. In a further aspect, the invention relates to a telecommunications system comprising: an interrogating server, IS, a service server SS, and a database server, UDB. In yet a further aspect the invention relates to one or more computer programs comprising program computer-executable instructions to be executed by: an interrogating server, IS, or by a service server SS, or by a database server, UDB.

The storage of the mark by the first reallocation procedure, allows the second allocation procedure to consider the existence of the mark and, thus, to execute actions allowing reallocating back the UE to the available most suitable SS.

According to the first aspect, a method is carried out by an interrogating server, IS. The method in the IS comprises a so called "first reallocation IS procedure" and a so called "second reallocation IS procedure". The first reallocation IS procedure comprises: [1] receiving a message from the UE or addressed to the UE including one or more user identifiers, [2] querying the UDB and obtaining—as a result—an identifier of the SS currently assigned to the UE or the corresponding SS capabilities, and [3] determining that the SS currently assigned to the UE, or that the SS that can be assigned to the UE according to the received SS capabilities, is unable to receive or process the received message. Upon de determination of [3], the first reallocation procedure comprises [4] sending the received message to another SS of the plurality—hereinafter referred to as "replacement SS"—further including an information element—hereinafter referred to as "user reallocated indication"—indicating the replacement SS that the UE is to be assigned to said replacement SS in substitution of another SS that has failed. The sending of a message comprising a "user reallocated indication" information element asks explicitly the SS (i.e. the replacement SS) to subsequently request the UDB to store, in relationship with at least one of the user identifiers: an identifier of said replacement SS as the currently assigned SS, and a data—hereinafter as "user reallocated data mark"—indicating that the UE has been assigned to a replacement SS to substitute another SS that has failed. The second reallocation IS procedure comprises: [5] receiving a registration message from a UE including one or more user identifiers, [6] querying the UDB and obtaining an identifier of the SS currently assigned to the UE and an information element—hereinafter referred to as "user reallocated notification from UDB"—if a user reallocated data mark is stored by the UDB in relationship with at least one of the user identifiers. When a "user reallocated notification from UDB", the second reallocation IS procedure comprises [7] selecting one SS among the plurality of SSs according to SS capabilities, and [8] sending to the selected SS the registration message received from the UE, wherein the registration message sent to the selected SS does not include a "user reallocated indication" information element. The sending of a message that do not comprise a "user reallocated indication" information element asks explicitly the SS to subsequently request the UDB to store, in relationship with at least one of the user identifiers, an identifier of said selected SS as the currently assigned SS, and to delete the user reallocated data mark.

According also the first aspect, a method is carried out by a service server, SS. The method in the SS comprises a so called "first reallocation SS procedure" and a so called "second reallocation SS procedure". The first reallocation SS procedure comprises: [1] receiving from an interrogating server, IS, a message originated by an UE or addressed to the UE including one or more user identifiers and further including an information element, hereinafter referred to as "user reallocated indication", indicating that the UE is to be assigned to said SS in substitution of another SS that has failed, and [2] sending a server assignment message to the UDB including an identifier of said SS, one or more user identifiers included in the received message, and further including an information element,—hereinafter referred to as "user reallocated notification from SS"—if the message received by the SS included a user reallocated indication. The sending a server assignment message to the UDB including a "user reallocated notification from SS" information element, asks explicitly the UDB to store, in relationship with at least one of the user identifiers, an identifier of said SS as the currently assigned SS, and a data—hereinafter as "user reallocated data mark"—indicating that the UE has been assigned to a replacement SS to substitute another SS that has failed. The second reallocation SS procedure comprises: [3] receiving from the IS a registration message originated by an UE including one or more user identifiers, wherein the registration message received from the IS does not include a user reallocated indication, and [4] sending a server assignment message to the UDB including an identifier of said SS and one or more user identifiers included in the received message, wherein said server assignment message does not include a user reallocated notification from SS. The sending a server assignment message to the UDB that does not include a "user reallocated notification from SS" information element asks explicitly the UDB to store, in relationship with at least one of the user identifiers, an identifier of said SS as the currently assigned SS, and to delete the user reallocated data mark (if any) stored in relationship of the user identifiers.

According also the first aspect, a method is carried out by a database server, UDB. The method in the UDB comprises a so called "first reallocation UDB procedure" and a so called "second reallocation UDB procedure". The first reallocation UDB procedure comprises: [1] receiving from a SS a server assignment message including an identifier of said SS, one or more user identifiers, and further including an information element—hereinafter referred to as "user reallocated notification from SS"—and [2] storing, in relationship with at least one of the user identifiers: an identifier of said SS as the currently assigned SS, and a data, hereinafter as "user reallocated data mark", indicating that the UE has been assigned to a replacement SS to substitute another SS that has failed. The second reallocation UDB procedure comprises: [3] receiving a query from the IS to obtain an identifier of the SS currently assigned to the UE including one or more user identifiers, [4] and reply to the IS query with an identifier of the currently assigned SS and with an information element—hereinafter referred to as "user reallocated notification from UDB"—if a user reallocated data mark is stored by the UDB in relationship with at least one of the user identifiers; thereby indicating the IS that a SS among the plurality has to be selected according to SS capabilities. The second reallocation UDB procedure further comprises: [5] receiving from a SS a server assignment message including an identifier of said SS, one or more user identifiers, wherein said server assignment message does not include a user reallocated notification from SS, [6] storing, in relationship with at least one of the user identifiers, an identifier of said SS as the currently assigned SS in replacement of the SS that was stored as the currently assigned SS, and [7] deleting the user reallocated data mark (if any) stored in relationship with any of the user identifiers.

According to embodiments of the invention, the telecommunications system comprises an Internet Protocol Multimedia Subsystem, IMS; wherein the interrogating server, IS, is configured as an "Interrogating-Call Session Control Function", I-CSCF, wherein the service servers, SSs, are configured as "Serving-Call Session Control Function", S-CSCF, and wherein user database server, UDB, is configured as a "Home Subscriber Server", HSS.

DETAILED DESCRIPTION

Figure 1:
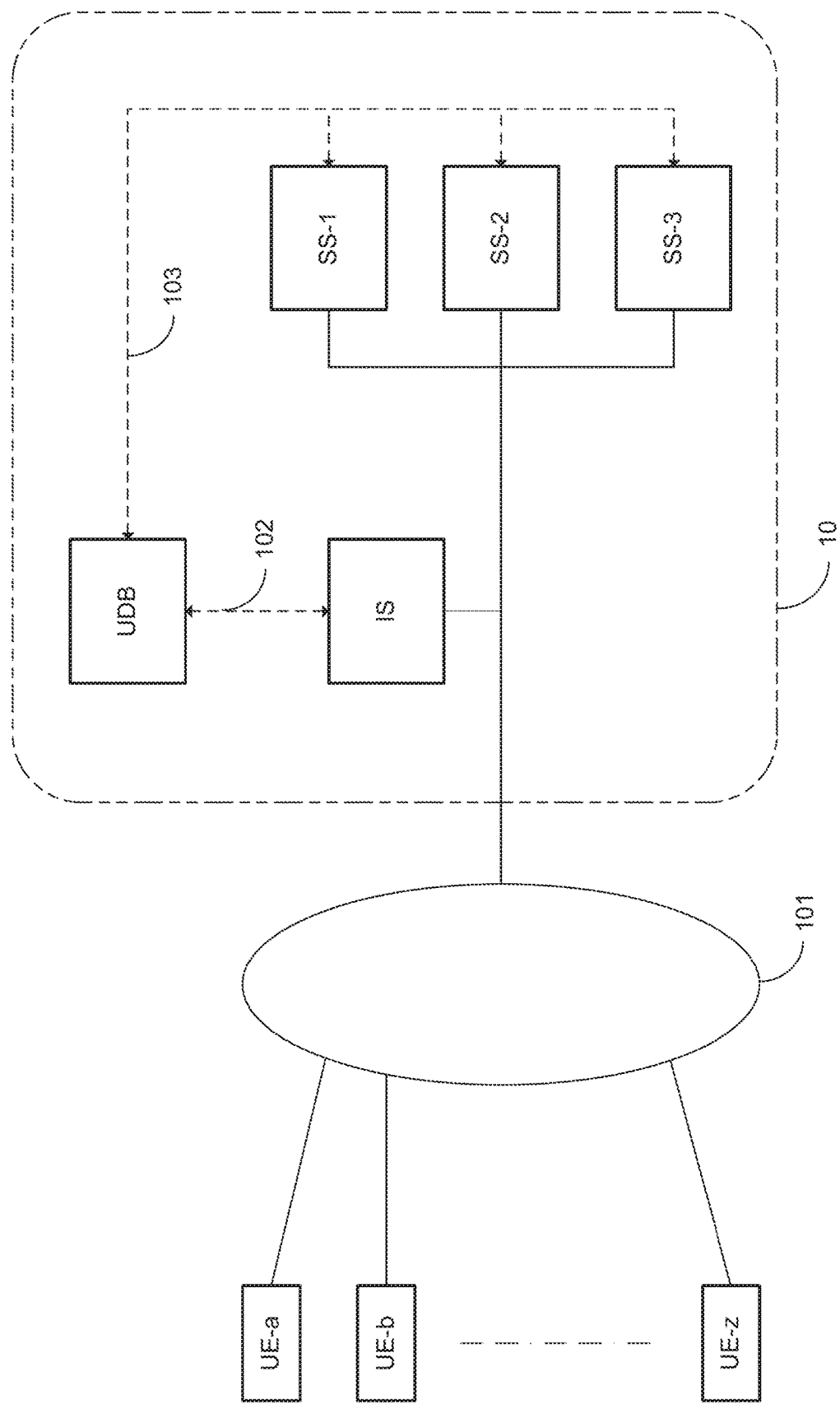
FIG. 1 illustrates schematically a telecommunication system according to the prior art.

The present invention shall now be described in conjunction with specific embodiments. These specific embodiments serve to provide the skilled person with a better understanding, but are not intended to in any way restrict the scope of the invention, which is defined by the appended claims.

Some embodiments of the invention are disclosed herein in respect to an Internet Protocol Multimedia Subsystem, IMS. Before entering to describe details of said embodiments, a brief description of the IMS is provided below.

The Internet Protocol Multimedia Subsystem, IMS, is a kind of telecommunications system that comprises, among other: a plurality of service servers, SS, configured to control communication sessions originated by a terminal device (UE) or addressed to the terminal device (UE), at least one database server, UDB, configured to store in relationship one or more identifiers identifying the UE or identifying the user of the UE—herein referred to as "user identifiers"—, and either or both an identifier of the SS currently assigned to the UE or information about the capabilities required for an SS to be assigned to the UE-herein referred to as "SS capabilities"—, and at least one interrogating server, IS, configured to query the UDB to obtain at least one of an identifier of the SS currently assigned to an UE and said SS capabilities. In short, the IMS offers a telecommunications system platform allowing to control the provision of a wide variety of communication services to a wide variety of types of UEs that can register/attach to the IMS via a wide variety of accesses.

The functionality of the SSs in an IMS are provide by servers implementing the so called "Serving-Call Session Control Function", S-CSCF. In short, the S-CSCF assigned to a UE receives session initiation messages (SIP "INVITE" messages) originated by the UE and/or addressed to the UE, and processes and further route them for the sake of allowing the establishment of a communication session between the UE and the corresponding counter party in the session. The S-CSCF also receives registration messages originated by the UE (both: initial registrations and re-registrations), so as to, among other: authenticate the UE on its initial registration or on its re-registration, and to communicate with the UDB (HSS, as referred below) to store an identifier of said S-CSCF in relationship with an identifier of the UE. An initial registration means that the UE was not currently attached to the IMS (and, generally, that the UE was not assigned to a SS), and a re-registration means that the UE was already attached to the IMS (and, generally, that it was already assigned to a SS).

The functionality of the UDB in an IMS is provided by one or more database servers implementing—e.g. in a centralized or distributed manner—the so called "Home Subscriber Server", HSS. In short, the HSS stores, among other, information about the UE and of the user of the UE who is subscriber of the IMS (that comprise, among other: user identifiers, service profile related to these identifiers), and, either or both: an identifier of the S-CSCF currently assigned to the UE (e.g. in case the UE is currently registered within the IMS), and/or information about the capabilities of an S-CSCF to be assigned to the UE (i.e. SS capabilities, which are usable for selecting a S-CSCF for the UE, for example: when the UE request initial registration in the IMS, or when it is received a SIP INVITE addressed to the UE but the UE is not currently registered in the IMS and—thus—there is not yet a S-CSCF assigned to the UE). The HSS receives messages from S-CSCFs requesting to assign an identifier of the S-CSCF to an identifier of the UE, thereby causing the storage by the HSS of these identifiers in relationship, and thereby stating said S-CSCF as the currently assigned SS to the UE. The HSS also receives messages from a I-CSCF whereby the I-CSCF queries the HSS to obtain an identifier of the S-CSCF currently assigned to a UE (e.g. if the UE is currently registered in the IMS), and/or whereby the I-CSCF queries the HSS to obtain SS capabilities for selecting a S-CSCF to be assigned to the UE (e.g. if the UE is not currently registered in the IMS). The SS capabilities held by an HSS allows the operator owning the IMS telecom system to configure rules for distributing the UEs of their subscribers between the plurality of available S-CSCF. These rules (and so, the information making up the SS capabilities) can take into account factors such as: features supported by a S-CSCF Vs. features that can be required to serve communication sessions involving a certain UE, geographical location of the UE Vs. geographical location of a S-CSCF, allocation of certain UE/s to certain S-CSCF/s (e.g. according to user identifiers), etc.

The functionality of the IS in an IMS is provided by one or more servers implementing the so called "Interrogating-Call Session Control Function", I-CSCF. In short, the I-CSCF receives session initiation messages (SIP "INVITE" messages) addressed to the UE, and also registration messages originated by the UE requesting an initial registration or a re-registration in the IMS. The I-CSCF then queries to the HSS to obtain, either: an identifier of the S-CSCF currently assigned to the UE or SS capabilities for selecting a S-CSCF for the UE. As a response, the I-CSCF receives responses from the that—generally—comprise: an identifier of a S-CSCF (e.g. when the UE is currently registered within the IMS), or information about SS capabilities. If a response from the HSS is received that comprises an identifier of a S-CSCF, the I-CSCF forwards the message received from the UE to the identified S-CSCF. Otherwise, the I-CSCF utilizes the SS capabilities information received from the HSS to select a S-CSCF and to forward the message received from the UE to the so selected S-CSCF.

Details of the IMS—and, in particular, details of: SS/S-CSCF, UDB/HSS and IS/I-CSCF—are described by 3GPP specifications: 3GPP TS 23.002 V12.2.0 (e.g. chapters: 3.3a, 4a.7.1, 4.1.1), and by 3GPP TS 23.228 V12.2.0 (the whole document, and, in particular: chapters 5.2.2.3 and 5.2.2.4 for UE registrations; and chapters 5.5, 5.6 and 5.7, for communication sessions originated from and/or addressed to the UE). Details of the messages exchanged between a UE and servers of an IMS (e.g. between the UE and a I-CSCF and a S-CSCF) are described by the 3GPP TS 24.229 V12.2.0 (the whole document, and particularly chapters: 5.3 and 5.4). Details of the messages exchanged between an I-CSCF and or a S-CSCF with the HSS, as well as procedures related to the processing of these messages by the HSS, are described by the 3GPP TS 29.228 V12.0.0 (the whole document, and particularly chapters: A2, A4, 6.1.1, 6.1.4 and 6.1.2). In particular the 3GPP TS 29.228 discloses the so called "Cx" interface between CSCFs and an HSS, which corresponds to the interfaces 102 and 103 referred earlier in respect to FIG. 1. The 3GPP TS 29.228 also discusses implementation details about the SS capabilities in respect to S-CSCFs of a telecommunication system comprising an IMS (e.g. on chapter 6.7; which are called therein as "S-CSCF capabilities") and provides an example of information for making up the information of SS capabilities (e.g. on Table 6.7). Although the details of the SS capabilities disclosed by TS 29.228 closely relate to a telecommunications system comprising a IMS, and wherein the SSs are accomplished by servers implementing in particular the so called S-CSCFs, it is apparent that the SS capabilities envisaged by the prior art generally relate to technical features implemented by a SS to attend a certain service (e.g. a registration request requiring a particular authentication mechanism) and/or to provide some features within a service (e.g. support of aliases, support of service prioritization, etc). Therefore, the information contained in a certain SS capability/ies is usable to determine which SS(s) of a plurality of SSs is(are) selectable for being assigned to a UE. For example—according to a stored mapping relating SS identifiers to their respective capabilities—, a certain set of one or more capabilities making up a first "SS capabilities" can determine that only two SS can be selected (e.g. SS-1, and SS-3), whilst a certain set of one or more capabilities making up a second "SS capabilities" can determine that any of the SSs can be selected (e.g. any one of SS-1 to SS-3).

For the sake of assigning to a terminal device (UE) a service server (SS) in case of failure, the 3GPP specifications discloses the so called restoration procedures in an IMS. In particular, the restoration procedures envisaged by 3GPP for an IMS are disclosed by the (aforementioned) TS 23.380 specification, and comprise replacing the (say first) S-CSCF that, either, is currently assigned to a UE, or that is the SS that should be assigned to the UE according to "SS capabilities", by another (say second) SS available in the IMS in case the "first" S-CSCF is determined as faulty. Said replacement can happen if, for example, the "first" S-CSCF fails to respond on time to a message originated and/or addressed to the UE, or simply neglects to process said message (e.g. by sending back any kind of error message indicating so).

Figure 2:
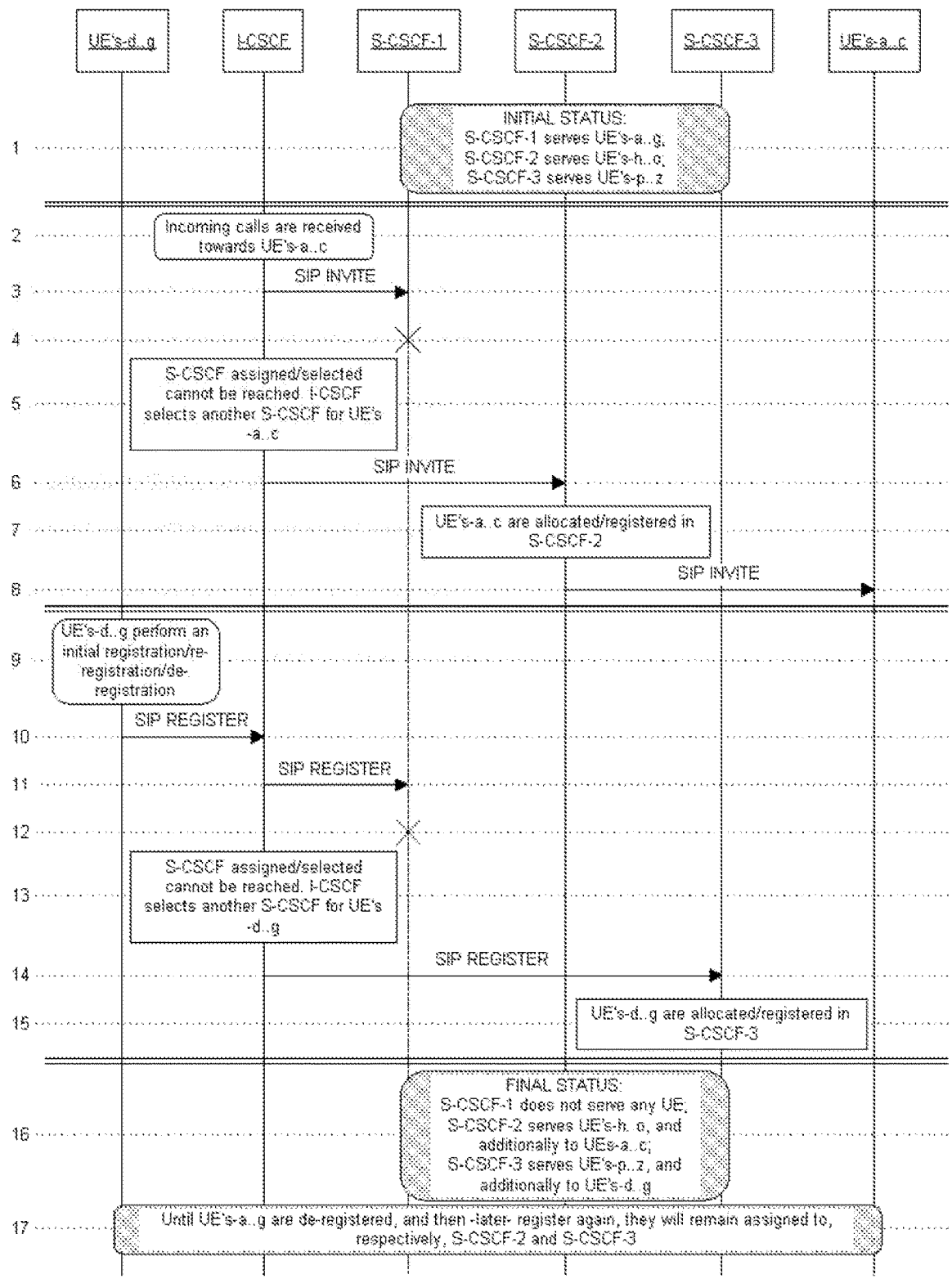
FIG. 2 shows a simplified signaling flow illustrating how UEs are reallocated to a SS in a telecommunications system comprising an IMS according to the prior art.

The FIG. 2 shows a simplified signaling flow illustrating how UEs are reallocated to a replacement S-CSCF in an IMS telecommunications system according to the cited prior art (i.e. 3GPP TS 23.380), and shall now be used to illustrate some of the problems addressed by the present invention. In particular, FIG. 2 illustrates what happens according to the prior art when a SS—such as a S-CSCF in an IMS—fails.

FIG. 2 flows and processing steps are now described below in respect to its numbered references on the left side of the figure:

1.—The initial status—illustrated as an example—assumes the following: that the S-CSCF-1 is the SS currently assigned to serve UEs: UE-a to UE-g, that the S-CSCF-2 is the SS currently assigned to serve UEs: UE-h to UE-o, and that the S-CSCF-3 is the SS currently assigned to serve UEs: UE-p to UE-z. The initial situation aligns—for the sake of illustration—with the initial situation at time to illustrated by FIG. 1.

2, 3.—In step 2, incoming session requests are received addressed (i.e. towards) any of the UEs UE-a to UE-c by the I-CSCF. The incoming session requests are, according to the illustrated example, received by the I-CSCF via Session Initiation Protocol, SIP, request "INVITE" from any other UE or server (not illustrated in the FIG. 2). The I-CSCF gets from the database server (HSS, not shown in the figure for simplicity) an identifier of the S-CSCF currently assigned to the UE (step not shown for simplicity), which (according to the illustrated example) results to be S-CSCF-1, and send to S-CSCF-1 the received session request message (SIP, INVITE).

4.—The I-CSCF determines that S-CSCF-1 is unable to receive or process the INVITE message. This can happen, for example, if the I-CSCF does not receive a response from S-CSCF-1 on a certain time, or if it receives from the S-CSCF-1 a negative response to the message sent on step 3.

5, 6.—In response to the fault detected in the step 4 above, the I-CSCF (i.e. following the prior art procedures disclosed, e.g.: by TS 23.380 on chapter 4.3.3, or by TS 24.229 on chapter 5.3.2.2) selects another S-CSCF based—among other—on SS capabilities information obtained from the HSS (step not shown for simplicity). The selected S-CSCF results to be—according to the illustrated example—the S-CSCF-2. Subsequently, the I-CSCF sends the received SIP INVITE message/s to the S-CSCF-2.

7.—The S-CSCF-2, upon reception of SIP INVITE message/s from UE/s for which said S-CSCF was not previously assigned as SS (i.e. S-CSCF-2 does not have any data about UEs UE-a to UE-c), obtains from the HSS the corresponding UE's related data, and gets subsequently to be the S-CSCF assigned to the UE/s (flows showing the interaction of S-CSCF-2 with the HSS not shown in the figure for simplicity).

8.—Subsequently the S-CSCF-2 further process the received SIP INVITE message/s by forwarding them towards the corresponding destination UEs.

9, 10.—Later, according to the illustrated example, registration messages are received from any of the UEs UE-d to UE-g by the I-CSCF. The registration messages can be, either: initial registration (i.e. the UE sending the registration message is currently not registered within the IMS, and, thus, not assigned to a S-CSCF), or a re-registration (i.e. the UE sending the registration message is currently registered within the IMS, and, thus, currently assigned to a S-CSCF). In the example, and for the sake of illustration, it is assumed that the received registration messages are for re-registration (i.e. the initial conditions disclosed for FIG. 2 step 1 above). The registration requests messages are, according to the illustrated example, received via SIP messages "REGISTER".

11.—The I-CSCF gets from the database server (HSS, not shown in the figure for simplicity) an identifier of the S-CSCF currently assigned to the UE (step not shown for simplicity), which (according to the illustrated example) results to be S-CSCF-1, and send to S-CSCF-1 the received session request message (SIP, REGISTER).

12.—The I-CSCF determines that S-CSCF-1 is unable to receive or process the REGISTER message. This can happen, for example, if the I-CSCF does not receive a response from S-CSCF-1 on a certain time, or if it receives from the S-CSCF-1 a negative response to the message sent on step 11.

13, 14.—In response to the fault detected in the step 12 above, the I-CSCF (i.e. following the prior art procedures disclosed, e.g.: by TS 23.380 on chapter 4.2.2, or by TS 24.229 on chapter 5.3.1.3) selects another S-CSCF based— among other—on SS capabilities information obtained from the HSS (step not shown for simplicity). The selected S-CSCF results to be—according to the illustrated example—the S-CSCF-3. Subsequently, the I-CSCF sends the received SIP REGISTER message/s to the S-CSCF-3.

15.—The S-CSCF-3, upon reception of SIP REGISTER message/s from UE/s for which said S-CSCF was not previously assigned as SS (i.e. S-CSCF-3 does not have any data about UEs UE-d to UE-g), obtains from the HSS the corresponding UE's related data, and gets subsequently to be the S-CSCF assigned to the UE/s (flows showing the interaction of S-CSCF-2 with the HSS not shown in the figure for simplicity). Subsequently, the S-CSCF-3 process the received SIP REGISTER message/s by authenticating UEs UE-d to UE-g (flows not shown for simplicity).

16.—The final status—according to the illustrated example—results in that the S-CSCF-1 do not serve to any of the UEs UE-a to UE-g. These UEs are—according to the illustrated example—being respectively served by S-CSCF-2 (which additionally serves to UEs: UE-a to UE-g) and by S-CSCF-3 (which additionally serves to UEs: UE-p to UE-z).

17.—The final status illustrated in 16 above will remain as such until the UEs: UE-a to UE-g, deregister from the IMS and register again into the IMS. Deregistering and registering again a UE commonly comprises, for example: the UE being turned off (or the UE getting out of coverage of any available access network during a certain time; e.g. a time exceeding re-registration periods), and the UE being later turned on (or the UE recovering back coverage of any available access network after exceeding re-registration periods). However, for certain kind of UEs, such as terminals connected through fixed wired connections, or certain types of M2M terminals, deregistering and registering again is something very unlikely to happen.

The example illustrated by FIG. 2, thus, illustrates that the teachings of the prior art may help to fix the problem of assigning S-CSCFs to UEs in case of failure of a particular S-CSCF, so that the UEs are served in a seamless and reliable manner by a telecommunications system via any available/replacement S-CSCF. However, the prior art does not address what to do when, for example, the UE's re-assignment process performed on a certain time (e.g. at $t_0$) results on an uneven load distribution of UEs per available S-CSCF. The prior art does not consider, for example, the case where the primarily assigned S-CSCF that failed might recover—e.g. after a certain time—and that said S-CSCF might be newly selectable for being assigned to a UE (e.g. to a UE that was reassigned to another S-CSCF because said primarily assigned S-CSCF had failed). Embodiments of the methods and apparatuses disclosed hereinafter illustrate how said resulting uneven load distribution of UEs per available S-CSCF can be remedied afterwards (i.e. after a UE was assigned to a second S-CSCF in replacement of a first S-CSCF that failed); for example, at a certain time $t_1 > t_0$ upon reception of a registration of a UE that was reallocated/reassigned to a second/replacement S-CSCF upon a failure of an (first) initially assigned—or to be assigned—S-CSCF. The embodiments disclosed hereinafter allow, for example, reallocating/reassigning a UE back to the initially (first) S-CSCF.

FIGS. 3 to 6 show flowcharts of a method according to embodiments of the invention.

Figure 3:
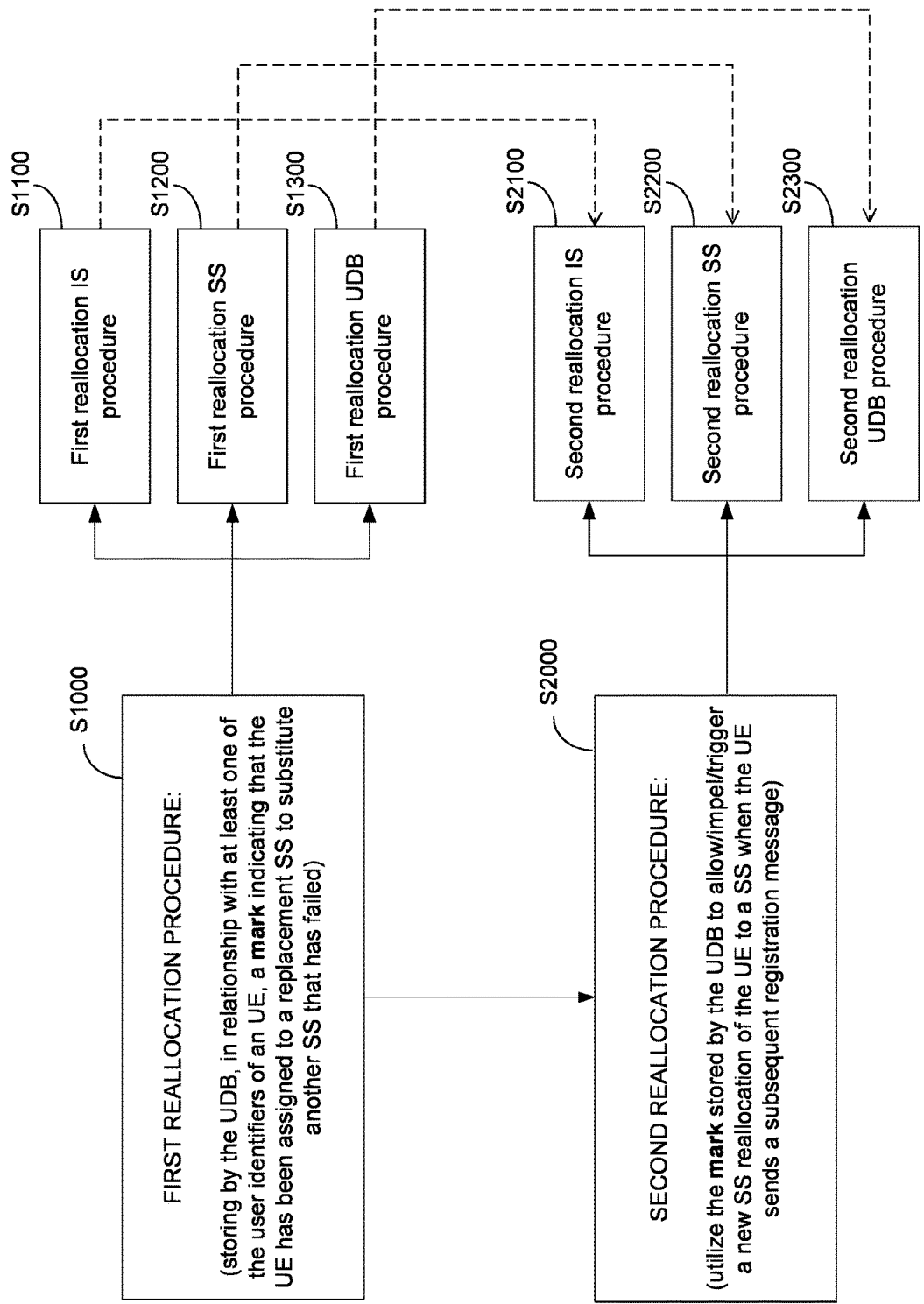
FIGS. 3 to 6 show flowcharts of a method according to embodiments of the invention.

The FIG. 3 is a flowchart of a method according to an embodiment of the invention. The method comprises: a "first reallocation procedure", S1000, and a "second reallocation procedure", S2000. The first reallocation procedure S1000 is carried out by servers (IS, SS-1 . . . SS-3, UDB) of the telecommunication system (10) when it is received a message from a UE, or a message addressed to the UE, and, either: the SS currently assigned to the UE, or the SS that should be assigned to the UE according to SS capabilities, is determined to be unable to receive or to process the received message. The second reallocation procedure S2000 is carried out by servers (IS, SS-1 . . . SS-3, UDB) of the telecommunication system (10) when—subsequently—it is received a registration from the UE.

For accomplishing with the first reallocation procedure, S1000, various servers of the telecommunication system (10) execute—in a distributed and cooperative manner— procedures (detailed later) that result in that a certain data— referred herein as a "user reallocated data mark" is stored by the UDB server in relationship with one or more of the user identifiers of the UE, indicating that the UE has been assigned to a replacement (second) SS to substitute another SS that failed (i.e. the SS that was currently assigned to the UE, or the SS that should be assigned to the UE according to SS capabilities). For accomplishing with the second reallocation procedure, S2000, servers of the telecommunication system (10) execute—in a distributed and cooperative manner—procedures (detailed later) for checking the existence of a "user reallocated data mark" stored in relationship with user identifiers of a UE and, if so, for triggering a new reallocation of the UE to an available SS which, preferably, is the most suitable SS for said UE. The storage of the "user reallocated data mark" by the first reallocation procedure, allows the second allocation procedure to be executed; thereby, allowing to utilize a previously stored "user reallocated data mark" for the purpose of reassigning back later a UE that was initially assigned to the replacement SS (by the first reallocation procedure) to the available most suitable SS in that moment (i.e. when the second allocation procedure is executed, e.g. at reception of a subsequent registration message from the UE). Therefore, the storage of the mark ("user reallocated data mark") by the first reallocation procedure in respect to an identifier of a UE allows—preferably, when the UE register again—the second allocation procedure to consider the existence of the mark and, thus, to execute actions allowing reallocating back the UE to the available most suitable SS. This can result, for example, in the UE to be assigned back to the SS that failed (e.g. if it has recovered, and now—i.e. at the time the second reallocation procedure is executed—is able to receive and process messages from/to the UE).

As illustrated by the continuous lines of FIG. 3, the first reallocation procedure S1000 comprises: a "first reallocation IS procedure", S1100, executed by the IS, a "first reallocation SS procedure", S1200, executed by a SS, and a "first reallocation UDB procedure", S1300, executed by the UDB. In turn, the second reallocation procedure comprises: a "second reallocation IS procedure", S2100, executed by the IS, a "second reallocation SS procedure", S2200, executed by a SS, and a "second reallocation UDB procedure", S2300, executed by the UDB. The dashed lines of FIG. 3 show the precedence of the "first reallocation procedure" and the "second reallocation procedure" within each of the corresponding servers (i.e., respectively, IS server, SS servers, and UDB server). In other words, the FIG. 3 illustrates an embodiment of the invention wherein the "first reallocation procedure" S1000 as well as the "second reallocation procedure" S2000 are carried out by IS server, by SSs servers, and by UDB server, sequentially, in a cooperative and corresponding/distributed manner.

Detailed steps of each of the procedures S1100 to S2300 cited above, as well as sequences of interactions between these procedures, shall now be described with reference to FIGS. 4 to 6. In order to illustrate in a clear manner the temporal sequence of events that happen in respect to an exemplary UE, firstly, the "first reallocation procedure" executed by, respectively: the IS, a SS, and the UDB (i.e. wherein the "user reallocated data mark" is finally stored by the UDB), shall be first described. Then, details of the "second reallocation procedure" executed by, respectively: the IS, SSs, and the UDB (i.e. wherein the "user reallocated data mark" is utilized to reassign back the UE to the most suitable SS), shall be described afterwards.

Figure 4:
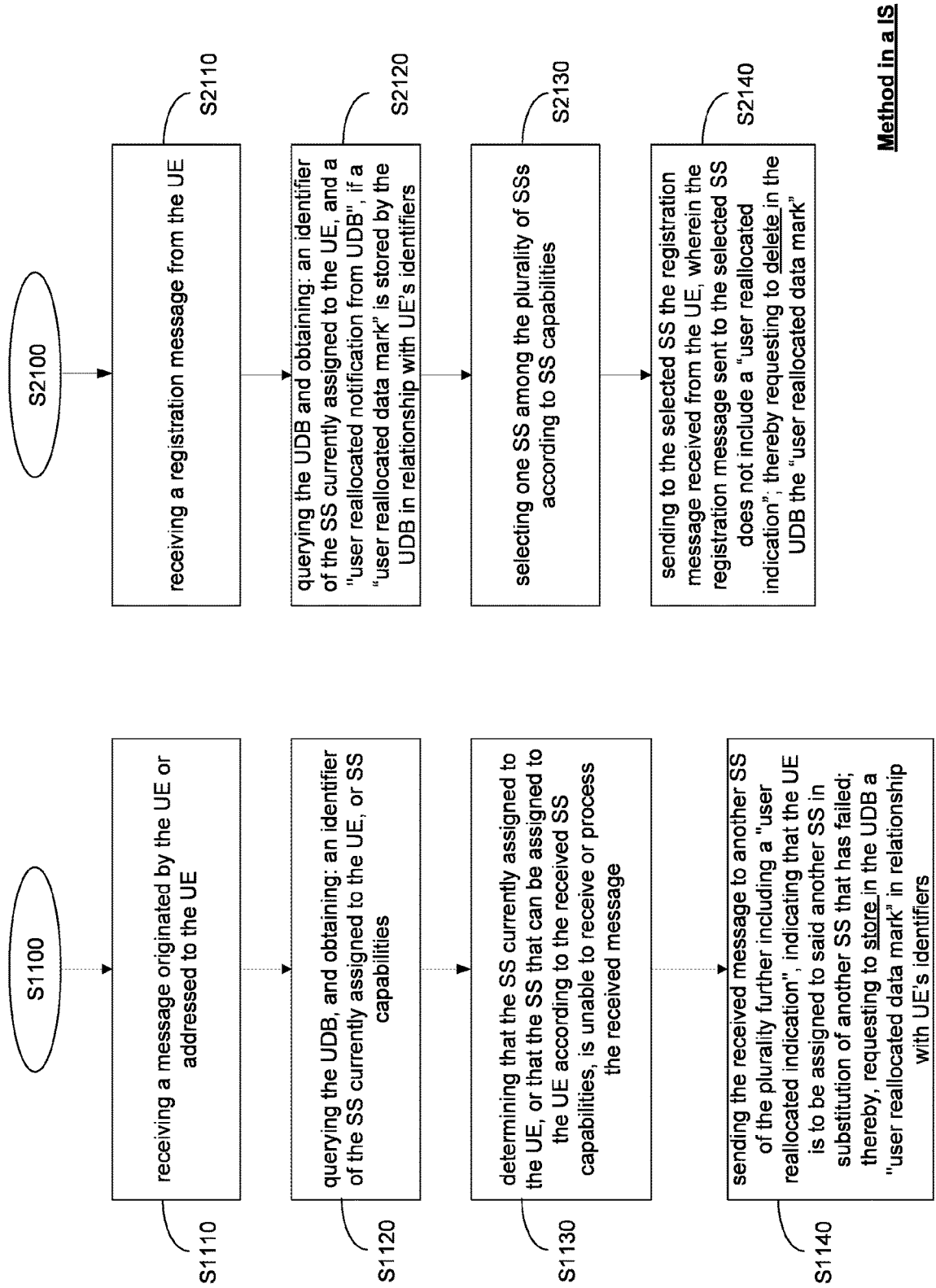

The FIG. 4 illustrates a flowchart of a method executed by an interrogating server (IS, I-CSCF) that, according to one embodiment of the invention, comprises both: a "first reallocation IS procedure", S1100, and a "second reallocation IS procedure", S2100.

The "first reallocation IS procedure" S1100 starts on step S1110 with the reception by the IS of a message from the UE, or with the reception by the IS of a message addressed to the UE.

The message received from the UE on step S1110 can be, for example, a registration message (e.g. a SIP REGISTER message) requesting an initial registration of the UE in the system 10 (i.e. the UE is not currently registered in the system and, thus, not assigned yet to a SS), or requesting a re-registration of the UE in the system 10 (i.e. the UE is currently registered in the system and, thus, already assigned to a SS). The message received from the UE on step S1110 can also be, for example, a message requesting to initiate a communication session with other party (e.g. a SIP INVITE message addressed towards other UE or towards an application server). A message addressed to the UE received on step S1110 can comprise, for example, a message received from other party (e.g. another UE or a certain application server) requesting to initiate a communication session towards the UE (e.g. a SIP INVITE message addressed towards the UE).

The procedure S1100 continues on step S1120, wherein the IS sends a message to the UDB querying it for obtaining back, either or both: an identifier of the SS currently assigned to the UE (e.g. in case the UE is already registered within the telecom system 10), or SS capabilities information usable for selecting by the IS a SS—among a plurality of SSs—that can be assigned to the UE (e.g. in case the UE is not yet registered within the telecom system 10).

Then, the procedure S1100 continues on step S1130, which comprises a determination made by the IS on that the SS to which the message received on step S1110 is to be forwarded (i.e. according to the information received from the UDB on step S1120), either: is unable to receive, or is unable to process, said message. For example, the IS forwards the message received on step S1110 to the SS identified by the UDB on step S1120, or to the SS selected by the IS according to the SS capabilities received from the UDB on step S1120; but the IS does not receive from said SS a positive response to the forwarded message within a predetermined time, or the IS receives a negative response from said SS to the forwarded message.

Subsequently to the determination by the IS of the unavailability of the say initially assigned—or to be assigned—SS made on step S1130, the procedure continues on step 1140; wherein the IS forwards the message received on step S1110 to another SS among the plurality of available SSs. For example, the IS may use SS capabilities (e.g.: SS capabilities previously obtained from the UDB on step S1120, or SS capabilities later obtained from the UDB as a result of the determination made on step S1130—this latest sub step not illustrated by the figure for simplicity—) for selecting a SS among the plurality, which is different from the SS that was determined as faulty on step S1130, and which still may fit to be the SS assigned to the UE (e.g. because it fulfills a minimum set of said SS capabilities) in replacement of a SS that has failed. Then, step 1140 further comprises the IS forwarding to the—so—newly selected (replacement) SS the message received on step S1110.

According to the illustrated embodiment, the forwarded message sent on step S1140 to the newly selected (replacement) SS further includes—i.e. in addition to some information elements originally received in the message—a new information element; hereinafter referred as "user reallocated indication". The presence of this new information element explicitly informs the receiver SS that the UE is to be assigned to said SS in replacement of another SS that has failed, and explicitly asks the SS to further store in the UDB, in relationship with any of the user identifiers of the UE: an identifier of said (replacement) SS as the currently assigned SS to the UE, and a data, hereinafter as "user reallocated data mark", indicating that the UE has been assigned to a replacement SS to substitute another SS that has failed.

After step S1140, the sequence of subsequent execution steps for accomplishing with the "first reallocation procedure", S1000, continues by executing the "first reallocation SS procedure" (S1200) and, then, by subsequently executing the "first reallocation UDB procedure" (S1300).

In summary: the "first reallocation IS procedure" S1100 implements procedural steps on an IS for accomplishing with the target of the reallocation procedure", S1000. Said target comprises—as referred earlier—getting that the UDB stores, in relationship with an identifier of the UE, a data making up a kind of "mark" indicating that the UE has been assigned to a replacement SS to substitute another SS that failed. Said "mark" shall then be used later—i.e. by the procedural steps belonging to the "second reallocation procedure", S2000—for the sake of triggering a new SS re-assignment/re-allocation process in respect to the UE.

Figure 5:
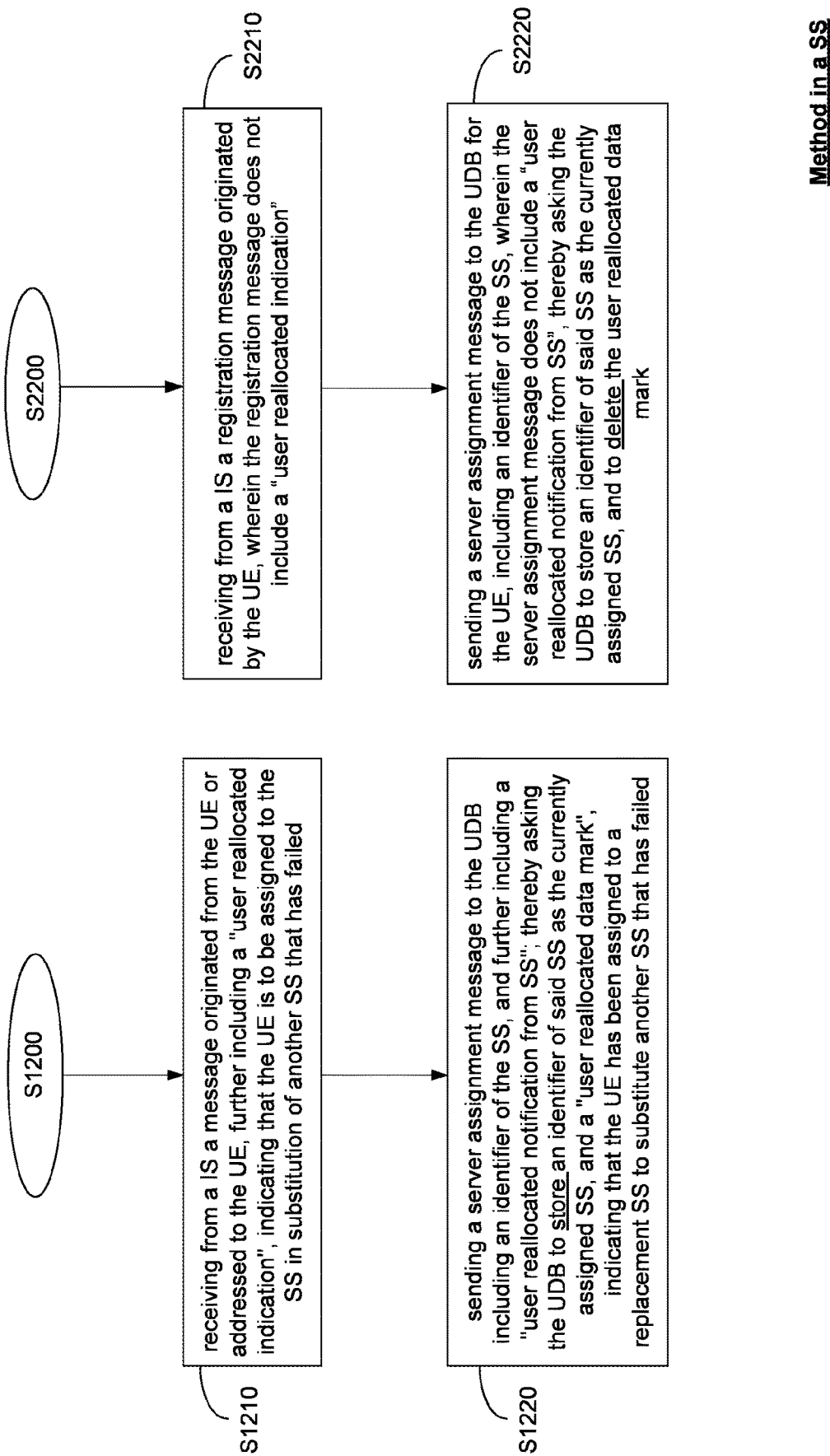

The FIG. 5 illustrates a flowchart of a method executed by a serving server (SS, S-CSCF) that, according to one embodiment of the invention, comprises both: a "first reallocation SS procedure", S1200, and a "second reallocation SS procedure", S2200.

The "first reallocation SS procedure" S1200 starts on step S1210 with the reception by a SS from the IS of a message originated by the UE or addressed to the UE (e.g. step 1140, FIG. 4). According to an embodiment, the message received by the SS from the IS further includes a "user reallocated indication". The presence of this new information element explicitly informs the receiver SS that the UE is to be assigned to said SS in replacement of another SS that has failed, and explicitly asks the SS to further store in the UDB, in relationship with any of the user identifiers of the UE: an identifier of said (replacement) SS as the currently assigned SS to the UE, and a data, hereinafter as "user reallocated data mark", indicating that the UE has been assigned to a replacement SS to substitute another SS that has failed.

Subsequently, on step 1220, the SS upon reception of the message received on step S1210 comprising a "user reallocated indication", sends a server assignment message to the UDB server including: an identifier of said SS, one or more user identifiers received in the message of step S1210, and further including an information element hereinafter referred as "user reallocated notification from SS". The presence of this new information element explicitly informs the UDB that the UE is assigned to said SS in replacement of another SS that has failed, and explicitly asks the UDB to store, in relationship with any of the user identifiers of the UE (i.e. user identifiers of the UE included by the SS on its server assignment message, or related user identifiers of the UE held by the UDB): an identifier of said SS as the currently assigned SS to the UE, and a data, hereinafter as "user reallocated data mark", indicating that the UE has been assigned to a replacement SS to substitute another SS that has failed.

After step S1220, the sequence of subsequent execution steps for accomplishing with the "first reallocation procedure", S1000, continues by executing the "first reallocation UDB procedure" (S1300).

In summary: the "first reallocation SS procedure" S1200 implements procedural steps on a SS for accomplishing—by a certain SS of the plurality of available SSs—with the target of the reallocation procedure", S1000. Said target comprises—as referred earlier—getting that the UDB stores, in relationship with an identifier of the UE, a data making up a kind of "mark" indicating that the UE has been assigned to a replacement SS to substitute another SS that failed. Said "mark" shall then be used later—i.e. by the procedural steps belonging to the "second reallocation procedure", S2000—for the sake of triggering a new SS re-assignment/re-allocation process in respect to the UE.

Figure 6:
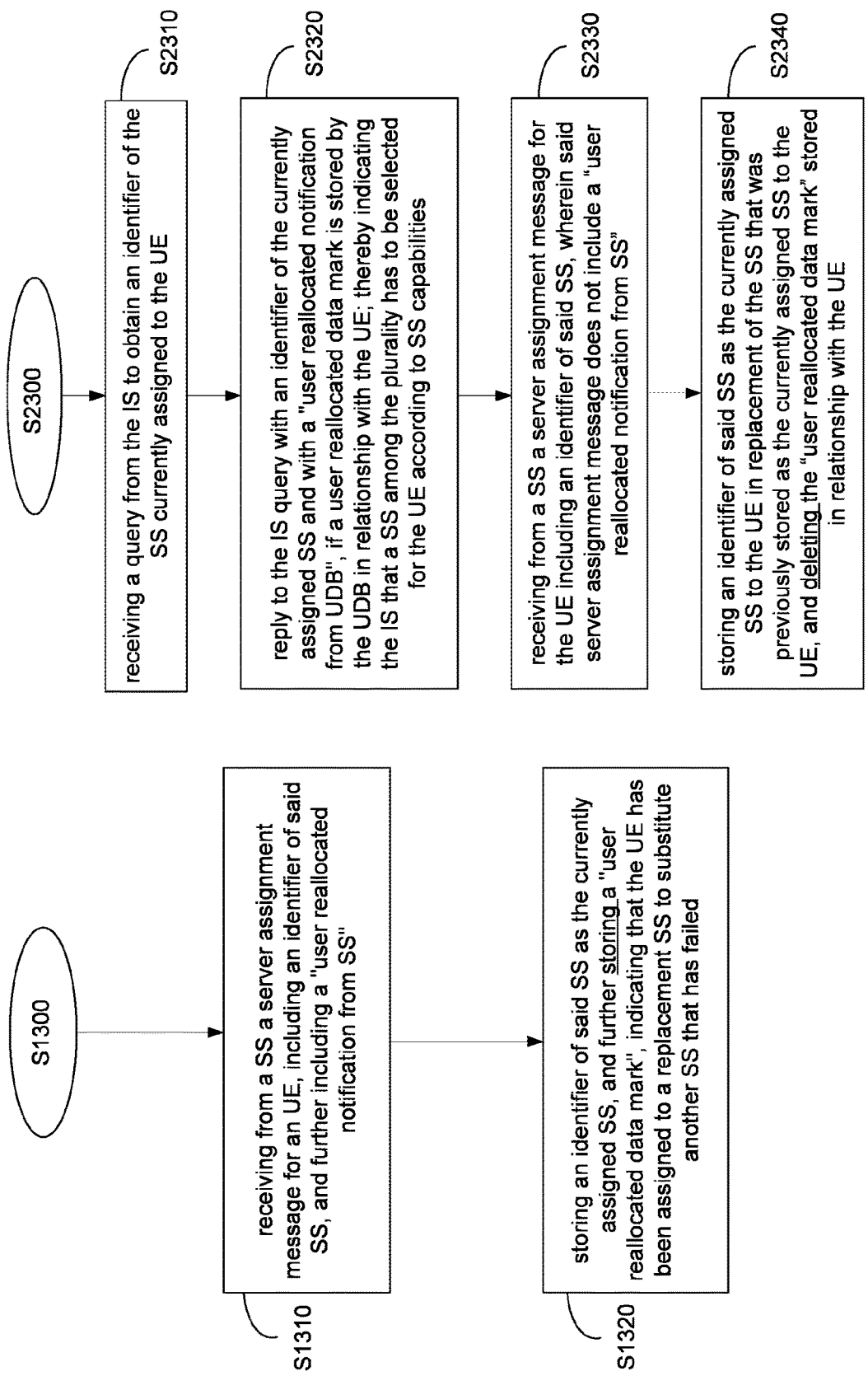

The FIG. 6 illustrates a flowchart of a method executed by a database server (UDB, HSS) that, according to one embodiment of the invention, comprises both: a "first reallocation UDB procedure", S1300, and a "second reallocation UDB procedure", S2300.

The "first reallocation UDB procedure" S1300 starts on step S1310 with the reception from a SS of a server assignment message for a UE. According to the prior art, the server assignment message from the UE comprises: an identifier of said SS, and one or more user identifiers of the UE received by the SS (in the message of step S1210). According to an embodiment of the invention, the message received by the UDB from a SS in step S1310 further comprises an information element hereinafter referred as "user reallocated notification from SS". The presence of this new information element explicitly informs the UDB that the UE is assigned to said SS in replacement of another SS that has failed, and explicitly asks the UDB to store, in relationship with any of the user identifiers of the UE: an identifier of said SS as the currently assigned SS to the UE, and a data, hereinafter as "user reallocated data mark", indicating that the UE has been assigned to a replacement SS to substitute another SS that has failed.

Subsequently, on step S1320, the UDB server stores, in relationship with any of the corresponding user identifiers (i.e. user identifiers received from the SS, or any user identifiers previously stored by the UDB in relationship with the user identifiers received from the SS): an identifier of said SS, and a "user reallocated data mark", indicating that the UE has been assigned to a replacement SS to substitute another SS that has failed.

In summary: the "first reallocation UDB procedure" S1300 implements procedural steps on a UDB for accomplishing with the target of the reallocation procedure", S1000. Said target comprises—as referred earlier—getting that the UDB stores, in relationship with an identifier of the UE, a data making up a kind of "mark" indicating that the UE has been assigned to a replacement SS to substitute another SS that failed. Said "mark" shall then be used later—i.e. by the procedural steps belonging to the "second reallocation procedure", S2000—for the sake of triggering a new SS re-assignment/re-allocation process in respect to the UE.

As explained above, the method, according to an embodiment of the invention comprises: a "first reallocation procedure" and a "second reallocation procedure". The first reallocation procedure allows—via IS/SS/UDB processing and interactions—storing by the UDB, in relationship with at least one of the user identifiers of a UE, a mark indicating that the UE has been assigned to a replacement SS to substitute another SS that has failed. Subsequently, the second reallocation procedure allows—also via IS/SS/UDB processing and interactions—to utilize later said mark to allow/impel or—in other words, trigger a new SS reallocation of the UE to a SS when the UE sends a subsequent registration message.

Details of the "first reallocation procedure" (S1000: S1100—IS—, S1200—SS—and S1300—UDB—) have been disclosed above with references to FIGS. 4 to 6. Now, a description in respect to the "second reallocation procedure" (S2000: S2100—IS—, S2200—SS— and S2300—UDB—) shall provided with references also to FIGS. 4 to 6.

As commented earlier, the goal of the "second reallocation procedure" is to allow that a UE that was reassigned—by the "first reallocation procedure"—to a certain SS (perhaps not the most optimal SS for the UE) because of a failure or unavailability of another SS (perhaps the most optimal SS for the UE), may be reassigned back—preferably, as soon as possible—to another SS (which is perhaps the most optimal SS for the UE).

The "second reallocation IS procedure" S2100 starts on step S2110 with the reception by the IS of a registration message from the UE. For the sake of illustrating the example, it can be assumed that the registration message comes from the UE that was (re)assigned earlier to a certain SS during the execution of the first reallocation procedure. Therefore, the registration message of step S2110 (e.g. a SIP REGISTER message) involves a re-registration. In any case, it is to be noticed that the IS can be—say—agnostic on if the registration message implies an initial registration of the UE or a re-registration; in fact, in the particular case of IMS, the IS (I-CSCF) queries in the same manner and with the same kind of content to the UDB (HSS) (i.e. the only exception of different content envisaged by 3GPP specifications is for "emergency registrations").

The procedure S2100 continues on step S2110, wherein the IS sends a message to the UDB querying it to obtain an identifier of the SS currently assigned to the UE, so as to allow—i.e. as dictated by the prior art—forwarding subsequently to said identified SS the registration message received earlier on step S2110. In this case, however, and since the "first reallocation procedure" was executed earlier in respect to this UE, the IS receives from the UDB a response message that, in addition to an information element comprising an identifier of the SS currently assigned to the UE (i.e. an identifier of the SS that was assigned to the UE at the execution of the "first reallocation procedure", further includes information element—referred herein as "user reallocated notification from UDB".

Said further information element "user reallocated notification from UDB" is only received if the UDB has currently—i.e. when the query from the IS is received—a "user reallocated data mark" in relationship with any of the user identifiers of the UE (i.e. previously described step S1320 executed by the UDB).

Therefore, step S2120 on the IS has a sequential continuation on time with the execution of steps S2310 and S2320 on the UDB, which are steps belonging to the part of the "second reallocation procedure" executed by the UDB—herein referred as "second reallocation UDB procedure", S2300—.

Returning back to the description of the "second reallocation IS procedure" S2100, the execution in the IS continues in step S2130, wherein the IS, conditioned by the reception of a response from the UDB that further includes the information element "user reallocated notification from UDB", selects—among the plurality of SSs—a SS where the UE is to be newly reallocated. The IS can select said SS according to SS capabilities previously obtained from the UDB on step S2120, or SS capabilities later obtained from the UDB (this latest sub step not illustrated by the figure for simplicity). The selection of step S2130 based on SS capabilities may result in that the IS gets a plurality of SSs that can be selected, and that can even include the SS identified by the UDB on step S2120; in said case, the IS preferably excludes said SS from the selectable SSs.

Subsequently, on step S2140, the IS sends the received registration message (step 2110) to the selected (step S2130) SS. In this case, an as opposed to the previously described step S1140 (executed in respect to the "first reallocation IS procedure", S1100), this time the IS does not include an information element indicating "user reallocated indication". The absence of this information element explicitly asks the receiver (selected) S-CSCF to communicate with the UDB so as to: request the UDB to store, in relationship with any of the user identifiers of the UE an identifier of said (selected) SS as the currently assigned SS to the UE, and further request the UDB to delete the "user reallocated data mark" (if any). In other words, a SS configured according to embodiments of this invention is—preferably—configured to, both: execute the "first reallocation SS procedure", S1200, as well as the "second reallocation SS procedure", 2200 (which shall be later described in detail). Therefore, a SS configured according to embodiments of this invention is configured to interpret the presence or the absence of an information element indicating "user reallocated indication" within a message received from an IS, and to subsequently act as described herein in respect to said presence or absence.

Certainly, any of the SSs of a telecommunications system (10) are preferably configured to, both: execute the "first reallocation SS procedure", S1200, as well as the "second reallocation SS procedure", 2200. This is because anyone of these SS can become unavailable to be assigned to a UE and, similarly, anyone of these SS can be the most suitable SS to be assigned to the UE. Details of the "first reallocation SS procedure", S1200, where described earlier. Now, details of the "second reallocation SS procedure", 2200, shall be described.

After step S2140 on the IS, the sequence of subsequent execution steps for accomplishing with the "second reallocation procedure", S2000, continues on the SS by executing the "second reallocation SS procedure" (S2200).

The "second reallocation SS procedure" S2200 starts on step S2110 with the reception by the SS, via the IS, of a registration message originated from the UE. The registration message received by the SS on step S2100 does not include an information element indicating "user reallocated indication". Therefore, the SS adapts its further processing accordingly. In other words: further actions of an SS (i.e. any SS) upon the reception by the SS of a message including a "user reallocated indication" information element (e.g. as in the previously described step S1220) is not the same as the further actions of an SS (i.e. any SS) upon the reception by the SS of a message that does not includes a "user reallocated indication" information element.

In particular, step S2220 comprises actions executed by a SS that receives a registration message via an IS that does not includes a "user reallocated indication" information element. The actions executed by the SS on step S2220 comprise: sending a server assignment message to the UDB server including: an identifier of said SS, one or more user identifiers received in the message of step S2210. As in the previously described step S1220, the server assignment message requests the UDB to store, in relationship with any of the user identifiers of the UE (i.e. user identifiers of the UE included by the SS on its server assignment message, or related user identifiers of the UE held by the UDB) an identifier of said SS as the SS currently assigned to the UE. However, and as opposed to the previously described step S1220, the server assignment message sent on step S2220 does not comprise a "user reallocated notification from SS"—i.e. since the received message from the SS did not include a "user reallocated indication" information element. The absence of a "user reallocated notification from SS" in the server assignment message sent by the SS to the UDB on step S2220 explicitly request the UDB to delete the "user reallocated data mark" (if any) stored in relationship with any of the user identifiers of the UE.

After execution of step S2220 on the SS, the sequence of subsequent execution steps for accomplishing with the "second reallocation procedure", S2000, continues on the UDB by executing steps S2330 and S2340 of the "second reallocation UDB procedure" (S2200), which shall now be described.

Accomplishing with the "second reallocation procedure", S2000, in the UDB involves (i.e. as illustrated by FIG. 6) the execution by the UDB of a "second reallocation UDB procedure", S2300, that comprises execution of steps: S2310 to S2340.

The functionality executed by the UDB on steps S2310 and S2320 has been commented earlier in respect to step S2120 on the IS. In particular, steps S2310 and S2320 are executed by the UDB as a part of its particular implementation of the "second allocation procedure" and to allow the IS to proceed with its own "second allocation procedure" steps (i.e. the steps making up the "second allocation IS procedure").

The step S2310 comprises the UDB receiving a message from the IS that queries the UDB for obtaining an identifier of the SS currently assigned to the UE. Since—following with the illustrated example—the UE (as identified by any of the received and/or related user identifiers) appears on the UDB as currently registered, and currently assigned to a certain SS (e.g. stored by the UDB earlier, on step S1320), the UDB replies back to the IS on step S2320 with a message that comprises an identifier of the SS currently assigned to the UE. However—following the example case—, as a "user reallocated data mark" is currently stored by the UDB in relationship with any of the user identifiers of the concerned UE, the reply message to the IS further includes an information element—referred herein as "user reallocated notification from UDB". Said information element explicitly asks the IS to select a SS—among the plurality of SSs—to be assigned to the UE (e.g. according to SS capabilities provided by the UDB to the IS on the reply of step S2320, or by responding a subsequent query from the IS—step not illustrated by the figure for simplicity—).

The "second reallocation UDB procedure" also comprises steps S2330 and S2340, which are executed by the UDB to attend a message received later from the SS that has been subsequently selected by the IS (i.e. as a result of the "user reallocated notification from UDB" sent previously by the UDB to the IS on step S2320). As commented earlier, execution of steps S2330 and S2340 by the UDB continue—in sequence—the step S2220 executed by a SS, and help to complete the "second reallocation procedure", S2000.

On step S2330 the UDB receives from a SS a server assignment message for the UE. The message includes: an identifier of the SS, and one or more user identifiers related to the UE in question. However, as opposed to the server assignment message received by the UDB on step S1310, the server assignment message received by the UDB in step S2330 does not include the information element "user reallocated notification from SS". The absence of a "user reallocated notification from SS" in a server assignment message sent by a SS to the UDB explicitly request the UDB to delete any "user reallocated data mark" that might be stored by the UDB in relationship with any of the user identifiers of the UE. Therefore, on step S2340, the UDB: stores an identifier of the SS that sent the server assignment message received on step S2330 in relationship with any of the user identifiers of the concerned UE (i.e. as dictated by the prior art), and further deletes any "user reallocated data mark" that might be stored by the UDB in relationship with any of the user identifiers of the UE.

Therefore, thereafter (i.e. as long as no "user reallocated data mark" is stored for the UE), the UDB considers that the UE is assigned to the SS that—among the plurality of SS—is best suited to serve the registration of said UE; and, accordingly—i.e. as far as a no "user reallocated data mark" is stored in relationship with any of the user identifiers of the UE—will respond to further subsequent queries that might be received from the IS with a reply that comprises, either or both: an identifier of the currently assigned SS, and SS capabilities; but will no include on its responses to the IS a "user reallocated notification from UDB".

The methods disclosed above with reference to FIGS. 3 to 6 provide a solution for managing the assignment of SSs in a telecommunication system when any of the SS(s) fail and, subsequently, one or more UEs that are affected by said failure(s) are to be reassigned to another SS on replacement of a SS that has failed which might be not the optimal one. This is, in short, achieved by—first—storing a mark (e.g. the aforementioned "user reallocated data mark") in relationship with identifier(s) related to the UE(s) that have been reassigned to a SS (replacement SS) in substitution of a SS that has failed, and by—subsequently—utilizing the existence of said mark to initiate (i.e. to trigger) a new reallocation process to assign a SS to the so marked UE(s). Accordingly, the operator of the telecommunications system is alleviated of having to reconfigure the current SS-per-UE assignment via manual operation & maintenance procedures when, for example, a SS is set out of operation (e.g. due to maintenance reasons), or becomes out of operation (e.g. due to a communication failure, or overload), and later it becomes in operation; which is specially applicable to terminal devices that connect to the telecommunication system via fixed wired connections or that are self operated M2M terminals (i.e., in general, terminal devices that barely deregister and register again from the telecommunications system). It is apparent from the description above that not necessarily all the SSs of a telecommunication system need to implement both of the procedures described above in respect to an SS (i.e. S1200 and S2200), but that at least 2 or more of any of the SSs implement at least one of these procedures; thereby allowing a (simple) case wherein a UE is reallocated to a second SS upon a failure of a first SS, and wherein the UE is reallocated back to the first SS.

With reference to examples illustrated by the aforementioned referenced FIGS. 3 to 6, the present disclosure offers a method of replacing the assignment of a UE from a non-preferred SS (i.e. a SS that is currently assigned to the UE, and that was assigned to the UE upon a failure of the preferred and/or initially assigned SS), to a preferred SS (i.e. a SS that suits with the SS capabilities required in respect to the UE). The replacement of SS currently assigned to the UE, from the non-preferred SS to the preferred SS takes place—according to the illustrated examples—when the UE re-registers in the telecommunications system (i.e. when it sends a registration message, and wherein the telecommunications system determines that the UE is currently re-registering in the system because there is a SS currently assigned to the UE that is likely a non-preferred SS, because e.g. a user reallocated data mark is stored in relationship to the UE).

The methods disclosed above with reference to FIGS. 3 to 6, may comprise further steps in the IS, in the SS and in the UDB, according to further embodiments. The disclosure that will be later given with reference to FIGS. 7 to 12 in respect to signaling flows within an IMS will provide details of these further steps; however, a short summary of these further steps is provided below:

According to one embodiment, the "second reallocation IS procedure" further comprises, when a user reallocated notification from UDB is received: determining that the SS identified by the UDB as the SS currently assigned to the UE rejects to process the received registration message, and then selecting one SS among the plurality of SSs according to SS capabilities. The step of determining by the IS that the identified SS rejects to process the received registration message can comprise: sending to the identified SS the received registration message further including an information element—hereinafter referred to as "user fall back indication"—indicating that the UE was assigned to said SS in substitution of another SS that failed, and receiving a negative response from the identified SS indicating an unavailability condition of said SS to process said registration message.

According to one embodiment, the "second reallocation SS procedure" further comprises receiving from the IS a registration message originated by the UE including one or more user identifiers, and further including an information element, hereinafter referred to as "user fall back indication", indicating that the UE was assigned to said SS in substitution of another SS that failed, and, either: sending a negative response message to the IS indicating an unavailability condition of said SS to process said registration message if there is an ongoing communication session controlled by the SS in respect to the UE, or sending a positive response message to the IS indicating the availability of said SS to process said registration message if there is not an ongoing communication session controlled by the SS in respect to the UE. According to an embodiment, the "second reallocation SS procedure" further comprises, wherein the received registration message includes a "user fall back indication" and further includes a requested registration time, sending the positive response to the IS including a registration time shorter than the requested registration time.

According to one embodiment, the "second reallocation UDB procedure" further comprises, wherein the server assignment message received from a SS does not include a "user reallocated notification from SS", and wherein a "user reallocated data mark" was previously stored in relationship with at least one of the user identifiers: sending a deregistration request message to the SS that was previously stored as the currently assigned SS including one or more user identifiers.

A description of some embodiments of the invention is now be provided with reference to the signaling flows illustrated by FIGS. 7 to 12. The embodiment illustrated by these figures envisage a telecommunications system comprising an Internet Protocol Multimedia subsystem (IMS) comprising: a plurality of S-CSCFs (i.e. service servers, SSs, as disclosed earlier), at least one I-CSCF (i.e. an interrogating server, IS, as disclosed earlier), and at least one HSS (i.e. a database server, UDB, as disclosed earlier).

Figure 11:
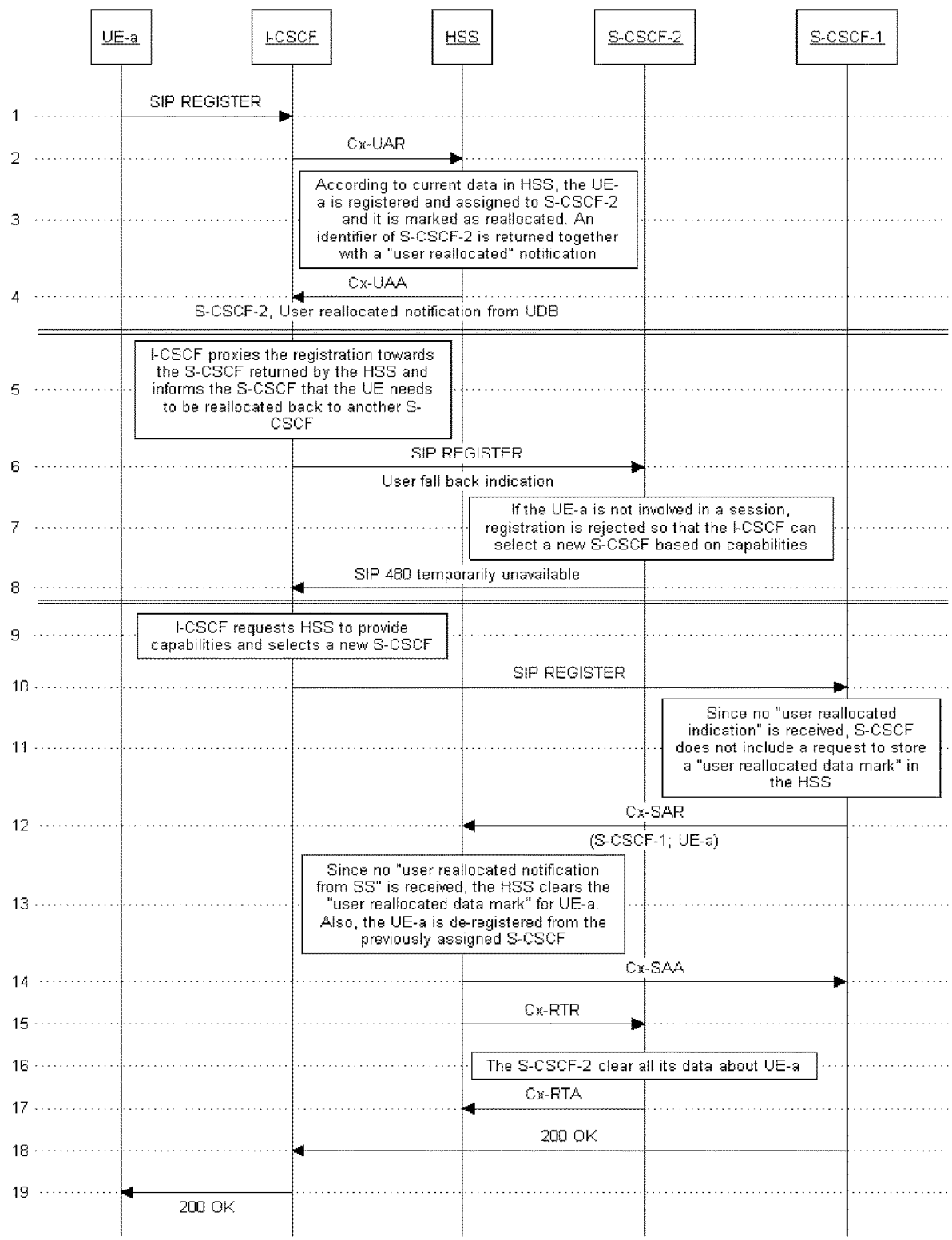
FIG. 11 shows a simplified signaling flow illustrating how a UE is reallocated back to a SS when it is re-registers and it is not involved in an ongoing communication session, according to one embodiment of the invention.
Figure 12:
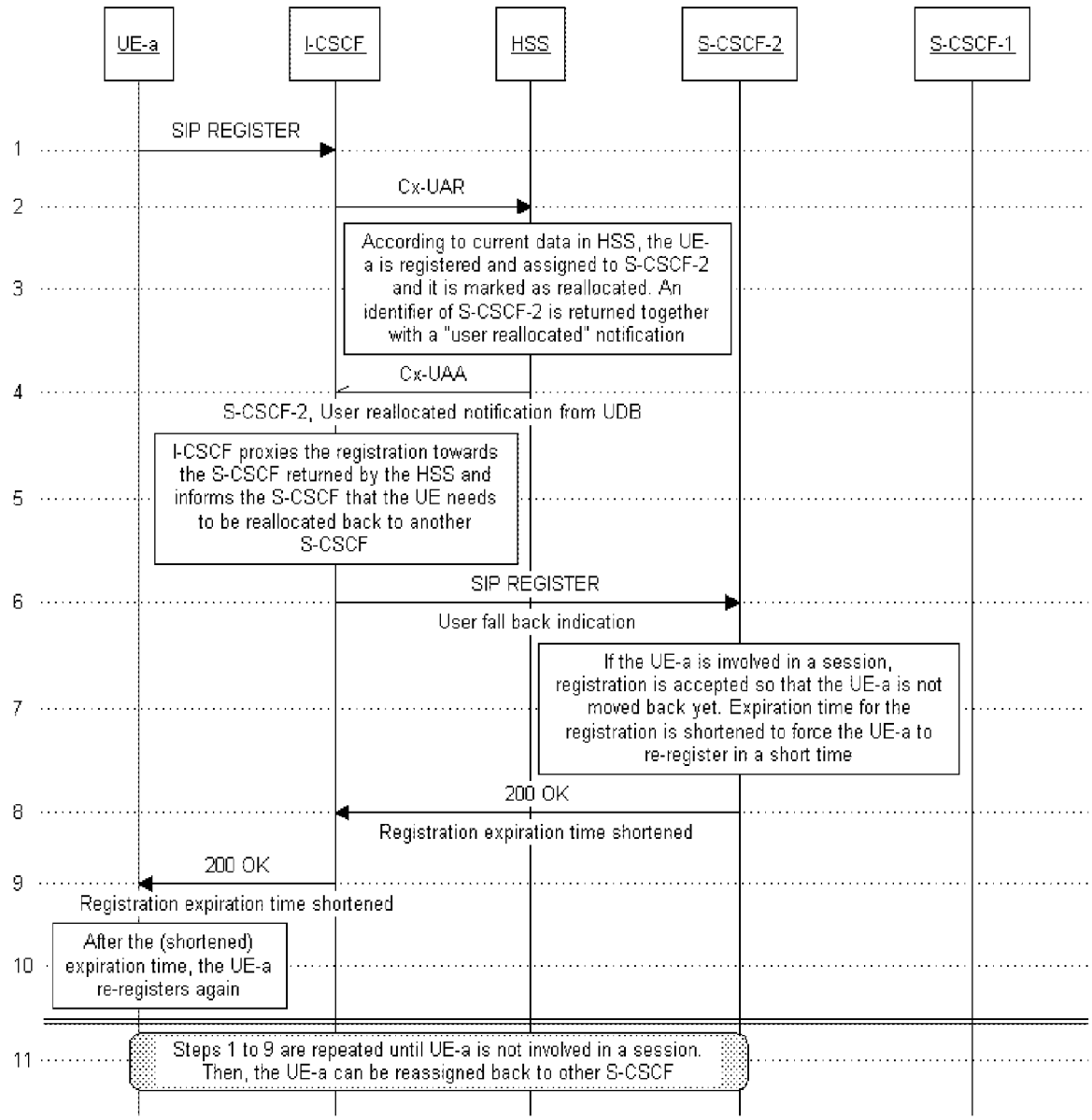
FIG. 12 shows a simplified signaling flow illustrating how a UE is reallocated back to a SS when it is re-registers and it is involved in an ongoing communication session, according to one embodiment of the invention

FIGS. 7 to 10 illustrate embodiments of the invention in respect to the "first reallocation procedure" which are executed, respectively, by a I-CSCF as an IS of the IMS (i.e. procedure S1100), by the S-CSCFs as SSs of the IMS (i.e. procedure 1200), and by the HSS as UDB of the IMS (i.e. procedure 1300). FIGS. 11 and 12 illustrate embodiments of the invention in respect to the "second reallocation procedure" which are executed, respectively, by a I-CSCF as an IS of the IMS (i.e. procedure S2100), by the S-CSCFs as SSs of the IMS (i.e. procedure 2200), and by the HSS as UDB of the IMS (i.e. procedure 2300).

Figure 7:
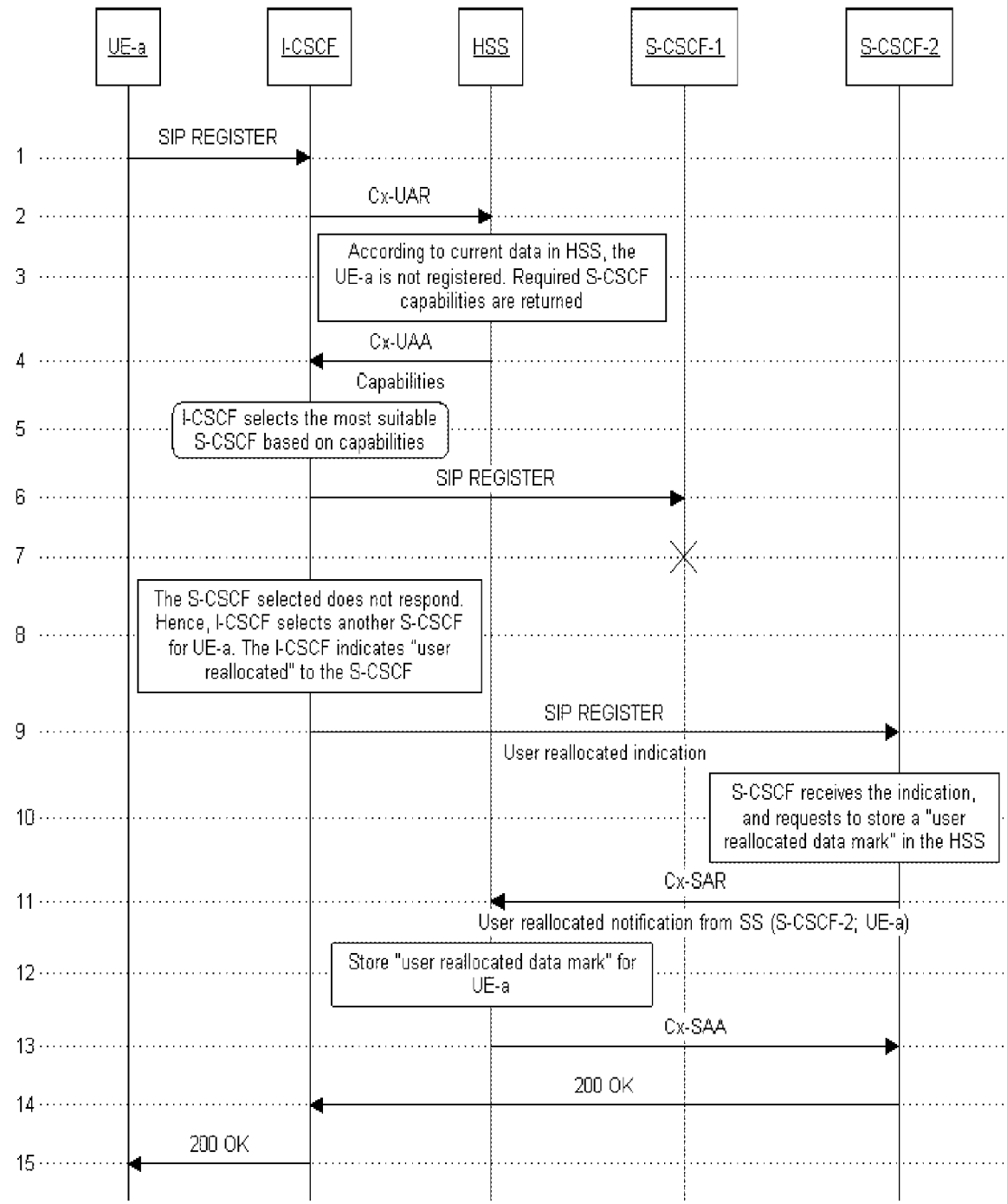
FIG. 7 shows a simplified signaling flow illustrating how a UE is reallocated to a SS at initial registration according to the prior art, and further illustrating modifications according to one embodiment of the invention.

FIG. 7 shows a simplified signaling flow illustrating how a UE is reallocated to a S-CSCF at initial registration according to the prior art, and further illustrating modifications according to one embodiment of the invention. In particular, FIG. 7 illustrates modifications for storing a "user reallocated data mark" in the HSS at initial registration of a UE, when the primarily to-be-assigned S-CSCF fails.

FIG. 7 flows and processing steps are now described below in respect to its numbered references on the left side of the figure:

1.—A SIP registration message REGISTER is received by the I-CSCF from UE-a.

2.—The I-CSCF, according to the prior art, queries the HSS to obtain, either: an identifier of the S-CSCF currently assigned to the UE-a, or the corresponding SS capabilities (i.e. S-CSCF capabilities) to select a suitable S-CSCF to be assigned to the UE-a. According to TS 29.228, the query to the HSS can be sent via DIAMETER protocol message "User-Authorization-Request", UAR.

3, 4.—According to the illustrated example (i.e. initial registration), the HSS finds on its current data that the UE-a is currently not registered in the IMS and, thus, not assigned to any S-CSCF. Therefore the HSS replies on flow 4 to the I-CSCF with SS capabilities to select a suitable S-CSCF to be assigned to the UE-a. According to TS 29.228, the query response to the I-CSCF can be sent via DIAMETER protocol message "User-Authorization-Answer", UAA.

5, 6.—The I-CSCF selects, among the available S-CSCFs and based on the SS capabilities obtained from the HSS, one S-CSCF that can be assigned to UE-a. That results in S-CSCF-1 being selected. Therefore, the received REGISTER message is sent to S-CSCF-1.

7.—The I-CSCF does not receive a response from S-CSCF-1 on due time (this may involve re-transmissions of the REGISTER message to the S-CSCF-1) or receives a negative response from S-CSCF-1 (e.g. a SIP response from the S-CSCF neglecting to attend the processing of said REGISTER message).

8.—The I-CSCF determines that the S-CSCF that can be assigned to the UE-a (i.e. S-CSCF-1) is unable to receive or process the received REGISTER message. Therefore, e.g., using the SS capabilities obtained from the HSS, the I-CSCF selects another S-CSCF. According to the example, S-CSCF-2 is selected.

9.—The I-CSCF sends the received REGISTER message to S-CSCF-2. The I-CSCF adds to the REGISTER a new information element, herein referred as "user reallocated indication". The new information element indicates that the UE with which said REGISTER message relates (i.e. UE-a) is to be assigned to said S-CSCF-2 in substitution of another S-CSCF (i.e. S-CSCF-1) that has failed.

This new information element can be added as a new Uniform Resource Identifier (URI) to the SIP message REGISTER in the route header; for example;

sip:s-cscf-2.domain.com;user-reallocated

10.—The S-CSCF-2 notes that the received message (SIP REGISTER) comprises the new information element "user reallocated indication". Therefore, it becomes aware that it was assigned in substitution of another S-CSCF that has failed (i.e. S-CSCF-1 in the example).

11.—The S-CSCF-2 sends a server assignment message to the HSS including, according to the prior art: an identifier of said S-CSCF, and one or more user identifiers of the UE-a included in the received message (REGISTER). According to an embodiment of the invention, the server assignment message further includes a new information element, herein referred to as "user reallocated notification from SS". The new information element indicates that the UE-a is assigned to said S-CSCF-2 in substitution of another S-CSCF (i.e. S-CSCF-1) that has failed. According to TS 29.228, the server assignment message to the HSS can be sent via DIAMETER protocol message "Server-Assignment-Request", SAR.

According to one embodiment of the invention, the structure of the server assignment request message, SAR, from a S-CSCF to the HSS, is modified so as to include a new information element (note that information elements are referred by the DIAMETER protocol as "attribute value pairs, AVPs") called herein "user reallocated notification". An example description of the resulting DIAMETER server assignment request message, SAR, is described below in respect to the current definition of said message given by the 3GPP TS 29.229 (chapter 6.1.2), wherein the novel information element (AVP) "User-Reallocated-Notification" is highlighted:

```
<Server-Assignment-Request> ::= < Diameter Header: 301, REQ, PXY,
16777216 >
            < Session-Id >
            { Vendor-Specific-Application-Id }
            { Auth-Session-State }
            { Origin-Host }
            { Origin-Realm }
            [ Destination-Host ]
            { Destination-Realm }
            [ User-Name ]
            *[ Supported-Features ]
            *[ Public-Identity ]
            [ Wildcarded-Public-Identity ]
            { Server-Name }
            { Server-Assignment-Type }
            { User-Data-Already-Available }
            [ SCSCF-Restoration-Info ]
            [ Multiple-Registration-Indication ]
            [ Session-Priority ]
            *[ AVP ]
            *[ Proxy-Info ]
            *[ Route-Record ]
            [ User-Reallocated-Notification ]
```

It is to be noticed that the aforementioned 3GPP TS 29.229 (V12.0.0) discloses details of the messages that, according to the previously mentioned TS.29.229, are exchanged via the so called "Cx" interface between CSCFs (I-CSCFs and S-CSCFs) and an HSS. The novel information element sent in the DIAMETER server assignment request message makes up an implementation of the "user reallocated notification from SS" according to this embodiment.

According to an implementation example, the mere presence of the new AVP "User-Reallocated-Notification" in a SAR message can indicate explicitly to the HSS that the S-CSCF sending the SAR message has been assigned to said S-CSCF in substitution of another S-CSCF that has failed (i.e. that was unable to receive or process a message concerning to the UE); thereby explicitly asking the HSS to store a kind of "mark" in respect to any of the user identifiers included in the SAR message (or any of the related user identifiers held by the HSS in respect to said received user identifier/s) indicating said event. Alternatively, according to another implementation example, the new AVP "User-Reallocated-Notification" in a SAR message can in turn comprise different values. For example, the new AVP "User-Reallocated-Notification" can be of type "enumerated" and can comprise two different values:

USER NOT REALLOCATED (0),
or
USER REALLOCATED (1);
wherein the value "0" would indicate that that the UE has not been reallocated to a S-CSCF in substitution of another S-CSCF that has failed, and wherein the value "1" would indicate that that the UE has been reallocated to a S-CSCF in substitution of another S-CSCF that has failed. Therefore, if this latest implementation option is followed, the message 11 shall then comprise the new AVP containing the value "1".

12.—The HSS, upon reception of the server assignment message (11), stores, in relationship with any of the user identifiers of UE-a, an identifier of the S-CSCF-2 as the currently assigned S-CSCF for said UE, and, since the new information element "user reallocated notification" is received from the S-CSCF, the HSS stores a "user reallocated data mark", indicating that the UE-a has been assigned to a replacement S-CSCF to substitute another S-CSCF that has failed.

13, 14, 15.—Acknowledge messages are sent back to the S-CSCF-2 and—then—to the UE-a (via the I-CSCF) acknowledging the registration of the UE-a, and confirming that it is currently assigned to S-CSCF-2. In particular, a DIAMETER message "Server-Assignment-Answer", SAA, is sent to S-CSCF-2, which in turn replies, via the I-CSCF, towards the UE-a with a SIP acknowledge message "200, OK".

Figure 8:
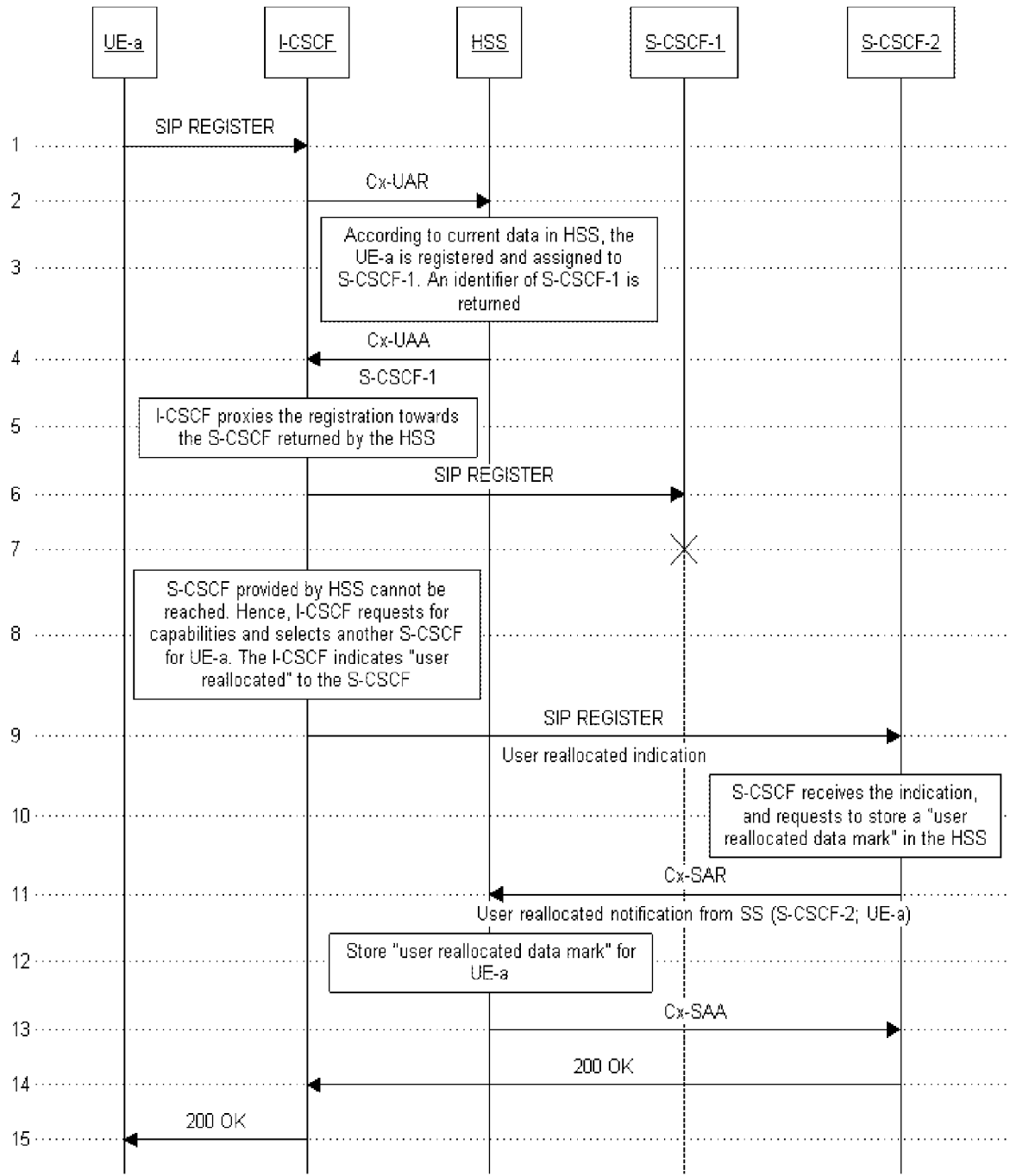
FIG. 8 shows a simplified signaling flow illustrating how a UE is reallocated to a SS at re-registration according to the prior art, and further illustrating modifications according to one embodiment of the invention.

FIG. 8 shows a simplified signaling flow illustrating how a UE is reallocated to a S-CSCF at re-registration according to the prior art, and further illustrating modifications according to one embodiment of the invention. In particular, FIG. 8 illustrates modifications for storing a "user reallocated data mark" in the HSS at re-registration of a UE, when the currently assigned S-CSCF to the UE fails.

FIG. 8 flows and processing steps are now described below in respect to its numbered references on the left side of the figure:

1.—A SIP registration message REGISTER is received by the I-CSCF from UE-a.

2.—The I-CSCF, according to the prior art, queries the HSS to obtain, either: an identifier of the S-CSCF currently assigned to the UE-a, or the corresponding SS capabilities to select a suitable S-CSCF to be assigned to the UE-a. According to TS 29.228, the query to the HSS can be sent via DIAMETER protocol message "User-Authorization-Request", UAR.

3, 4.—According to the illustrated example (i.e. re-registration), the HSS finds on its current data that the UE-a is currently registered in the IMS and assigned to S-CSCF-1. Therefore the HSS replies on flow 4 to the I-CSCF with a DIAMETER UAA message containing an identifier of S-CSCF-1.

5, 6.—The I-CSCF, according to the information received from the HSS, forwards the received REGISTER to S-CSCF-1.

7.—The I-CSCF does not receive a response from S-CSCF-1 on due time (this may involve re-transmissions of the REGISTER message to the S-CSCF-1) or receives a negative response from S-CSCF-1 (e.g. a SIP response from the S-CSCF neglecting to attend the processing of said REGISTER message).

8.—The I-CSCF determines that the S-CSCF currently assigned to the UE-a is unable to receive or process the received REGISTER message. Therefore, e.g., using the SS capabilities obtained from the HSS, the I-CSCF selects another S-CSCF. According to the example, S-CSCF-2 is selected.

9.—The I-CSCF sends the received REGISTER message to S-CSCF-2. The I-CSCF adds to the REGISTER a new information element, herein referred as "user reallocated indication". The new information element indicates that the UE with which said REGISTER message relates (i.e., UE-a)

is to be assigned to said S-CSCF-2 in substitution of another S-CSCF (i.e. S-CSCF-1) that has failed.

This new information element can be added as a new Uniform Resource Identifier (URI) to the SIP message REGISTER in the route header (e.g. as referred above in respect to FIG. 7, flow 9).

10.—The S-CSCF-2 notes that the received message (SIP REGISTER) comprises the new information element "user reallocated indication". Therefore, it becomes aware that it was assigned in substitution of another S-CSCF that has failed (i.e. S-CSCF-1 in the example).

11.—The S-CSCF-2 sends a server assignment message to the HSS including, according to the prior art: an identifier of said S-CSCF, and one or more user identifiers of the UE-a included in the received message (REGISTER). According to an embodiment of the invention, the server assignment message further includes a new information element, herein referred to as "user reallocated notification from SS". The new information element indicates that the UE-a is assigned to said S-CSCF-2 in substitution of another S-CSCF (i.e. S-CSCF-1) that has failed. According to TS 29.228, the server assignment message to the HSS can be sent via DIAMETER protocol message "Server-Assignment-Request", SAR. The modified contents of the server assignment message, SAR, are as disclosed earlier in respect to flow 11 of FIG. 7).

12.—The HSS, upon reception of the server assignment message (11), stores, in relationship with any of the identifiers of UE-a, an identifier of the S-CSCF-2 as the currently assigned S-CSCF for said UE, and, since the new information element "user reallocated notification" is received from the S-CSCF, the HSS stores a "user reallocated data mark", indicating that the UE-a has been assigned to a replacement S-CSCF to substitute another S-CSCF that has failed.

13, 14, 15.—Acknowledge messages are sent back to the S-CSCF-2 and—then—to the UE-a (via the I-CSCF) acknowledging the registration of the UE-a, and confirming that it is currently assigned to S-CSCF-2. In particular, a DIAMETER message "Server-Assignment-Answer", SAA, is sent to S-CSCF-2, which in turn replies, via the I-CSCF, towards the UE-a with a SIP acknowledge message "200, OK".

Figure 9:
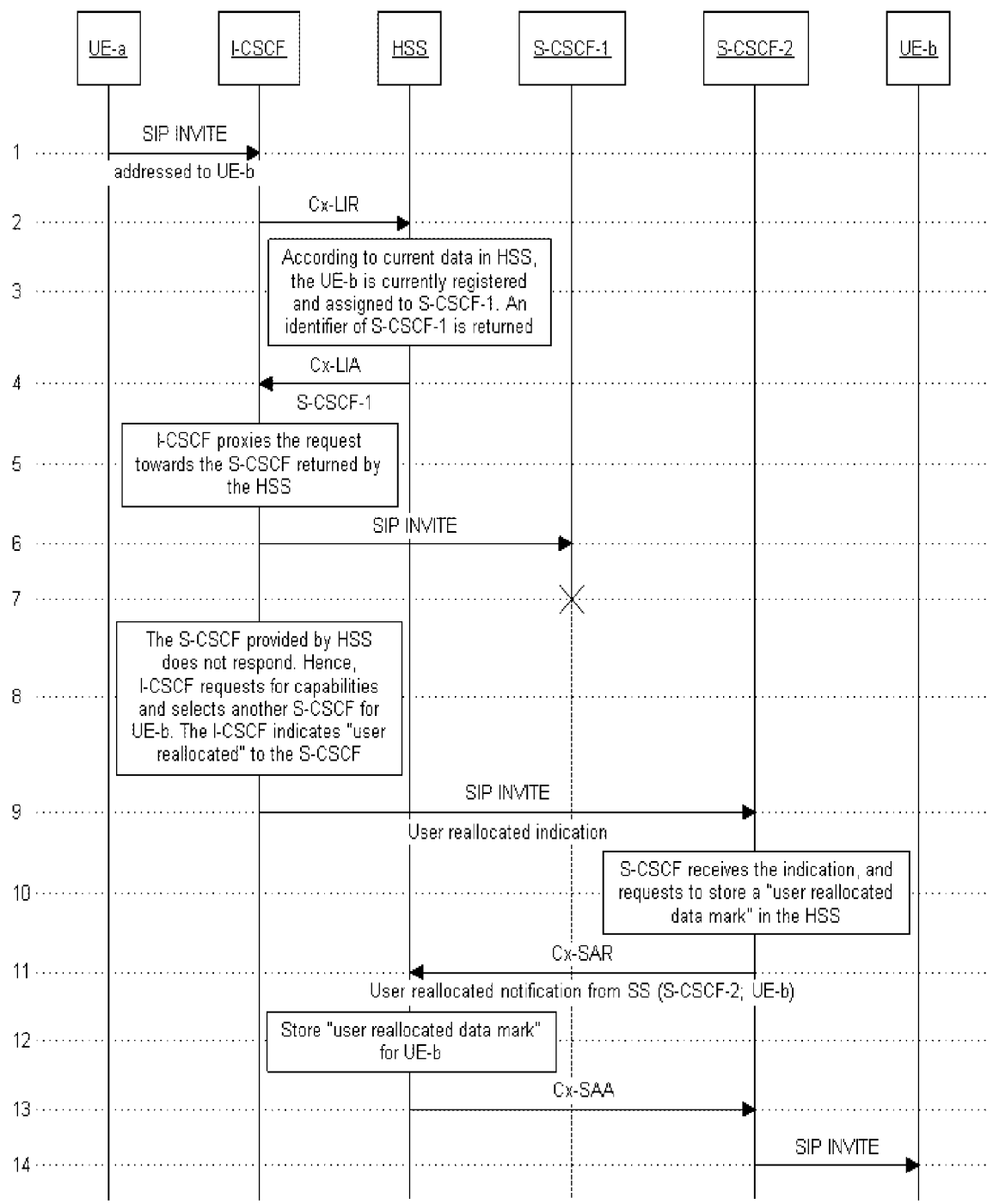
FIG. 9 shows a simplified signaling flow illustrating how a UE is reallocated to a SS when it is received a message to initiate a session addressed to the UE and the UE is currently assigned to a SS, according to the prior art, and further illustrating modifications according to one embodiment of the invention.

FIG. 9 shows a simplified signaling flow illustrating how a UE is reallocated to a S-CSCF when it is received a message to initiate a communication session addressed to the UE and the UE is currently assigned to a S-CSCF, according to the prior art, and further illustrating modifications according to one embodiment of the invention. In particular, FIG. 9 illustrates modifications for storing a "user reallocated data mark" in the HSS when the S-CSCF currently assigned to a UE (UE-b) for which it is received a terminating communication session request addressed to said UE (e.g. a SIP INVITE addressed to the UE-b) is received fails.

FIG. 9 flows and processing steps are now described below in respect to its numbered references on the left side of the figure:

1.—A SIP message INVITE is received by the I-CSCF from UE-a addressed towards UE-b; thereby asking to initiate a communication session with UE-b.

2.—The I-CSCF, according to the prior art, queries the HSS to obtain, either: an identifier of the S-CSCF currently assigned to the UE-b, or the corresponding SS capabilities to select a suitable S-CSCF to be assigned to the UE-b (i.e. a suitable S-CSCF for controlling communication sessions addressed to the UE-b when e.g. said UE is not currently registered in the IMS). According to TS 29.228, the query to the HSS can be sent via DIAMETER protocol message "Location-Info-Request", LIR.

3, 4.—According to the illustrated example (i.e. UE-b currently registered in the IMS), the HSS finds on its current data that the UE-b is currently registered in the IMS and assigned to S-CSCF-1. Therefore the HSS replies on flow 4 to the I-CSCF with a DIAMETER message "Location-Info-Answer", LIA, containing an identifier of S-CSCF-1 (i.e. which is the currently assigned S-CSCF to the UE-b).

5, 6.—The I-CSCF, according to the information received from the HSS, forwards the received INVITE message to S-CSCF-1.

7.—The I-CSCF does not receive a positive response from S-CSCF-1 on due time. For example, the I-CSCF does not receive from S-CSCF-1 a SIP "Trying, 100" message, or a SIP "Session Progress, 183" message.

8.—The I-CSCF determines that the S-CSCF currently assigned to the UE-b is unable to receive or process the received REGISTER message. Therefore, e.g., using the SS capabilities obtained from the HSS (which might have been obtained in flow 4, or by a subsequent flow after the fault detected on step 7—not illustrated in the figure for simplicity—), the I-CSCF selects another S-CSCF. According to the example, S-CSCF-2 is selected.

9.—The I-CSCF sends the received INVITE message to S-CSCF-2. The I-CSCF adds to the INVITE message a new information element, herein referred as "user reallocated indication". The new information element indicates that the UE to which said INVITE message is addressed to (i.e. UE-b) is to be assigned to said S-CSCF-2 in substitution of another S-CSCF (i.e. S-CSCF-1) that has failed.

This new information element can be added as a new Uniform Resource Identifier (URI) to the SIP message REGISTER in the route header (e.g. as referred above in respect to FIG. 7, flow 9).

10.—The S-CSCF-2 notes that the received message (SIP INVITE) comprises the new information element "user reallocated indication". Therefore, it becomes aware that it was assigned in substitution of another S-CSCF that has failed (i.e. S-CSCF-1 in the example).

11.—The S-CSCF-2 sends a server assignment message to the HSS including, according to the prior art: an identifier of said S-CSCF, and one or more user identifiers of the UE-b included in the received message (INVITE). According to an embodiment of the invention, the server assignment message further includes a new information element, herein referred to as "user reallocated notification from SS". The new information element indicates that the UE-b is assigned to said S-CSCF-2 in substitution of another S-CSCF (i.e. S-CSCF-1) that has failed. According to TS 29.228, the server assignment message to the HSS can be sent via DIAMETER protocol message "Server-Assignment-Request", SAR. The modified contents of the server assignment message, SAR, are as disclosed earlier in respect to flow 11 of FIG. 7).

12.—The HSS, upon reception of the server assignment message (11), stores, in relationship with any of the identifiers of UE-b, an identifier of the S-CSCF-2 as the currently assigned S-CSCF for said UE, and, since the new information element "user reallocated notification" is received from the S-CSCF, the HSS stores a "user reallocated data mark", indicating that the UE-b has been assigned to a replacement S-CSCF to substitute another S-CSCF that has failed.

13.—An acknowledge message, via DIAMETER message "Server-Assignment-Answer", SAA, is sent to the S-CSCF-2 confirming that it is the currently assigned S-CSCF for UE-b. The SAA message sent to the S-CSCF-2 comprise user profile in respect to the UE and, in particular, the—so called—"filter criteria", which can be utilized by the S-CSCF (i.e. S-CSCF-2) to process and further route messages originated and/or terminated by the UE.

14.—Then, the S-CSCF-2 forwards the received INVITE message towards the UE-b (the S-CSCF-2 does not include in the SIP INVITE message of flow 14 the "user reallocated notification" that was earlier received from the I-CSCF, since now it is not relevant). Although not show in the figure, the S-CSCF-2 sends back towards the I-CSCF positive progress messages indicating that it is currently processing the INVITE message received earlier in flow 9.

Figure 10:
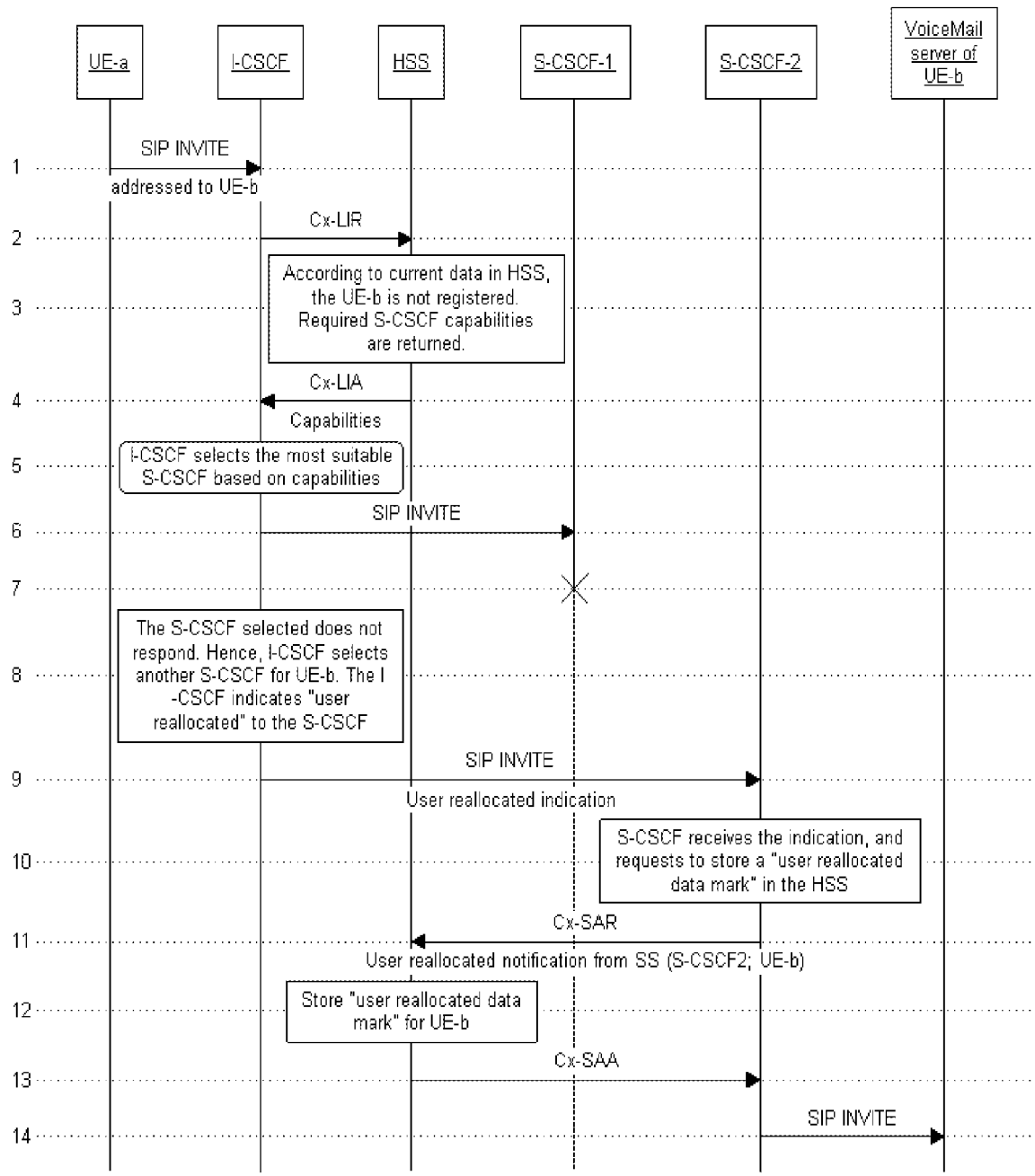
FIG. 10 shows a simplified signaling flow illustrating how a UE is reallocated to a SS when it is received a message to initiate a session addressed to the UE, and the UE is currently not assigned to a SS, according to the prior art, and further illustrating modifications according to one embodiment of the invention.

FIG. 10 shows a simplified signaling flow illustrating how a UE is reallocated to a S-CSCF when it is received a message to initiate a communication session addressed to the UE and the UE is not currently registered in the IMS and, thus, not being currently assigned to a S-CSCF, according to the prior art, and further illustrating modifications according to one embodiment of the invention. In particular, FIG. 9 illustrates modifications for storing a "user reallocated data mark" in the HSS when the primarily to-be-assigned S-CSCF to attend the communication session addressed to a non currently registered UE (UE-b) fails (e.g. a SIP INVITE addressed to the UE-b and, thus, intended to be terminated by the UE-b).

FIG. 10 flows and processing steps are now described below in respect to its numbered references on the left side of the figure:

1, 2.—The description of these flows is the same as the ones provided earlier in respect to FIG. 9.

3, 4.—According to the illustrated example (i.e. UE-b not currently registered in the IMS), the HSS finds on its current data that the UE-b is not currently registered in the IMS and, thus, not being assigned to any S-CSCF. Therefore the HSS replies on flow 4 to the I-CSCF with a DIAMETER message "Location-Info-Answer", LIA, containing SS capabilities usable by the I-CSCF to select a suitable S-CSCF to be assigned to the UE-b (at least, whilst the UE-b is not registered within the IMS).

5, 6.—The I-CSCF selects, among the available S-CSCFs and based on the SS capabilities obtained from the HSS, one S-CSCF that can be assigned to UE-b. That results in S-CSCF-1 being selected. Therefore, the received INVITE message is sent to S-CSCF-1.

7 to 13.—The description of these flows is the same as the ones provided earlier in respect to FIG. 9. In particular, as in the previous case described in FIG. 9, the HSS stores, in relationship with any of the identifiers of UE-b, an identifier of the S-CSCF-2 as the currently assigned S-CSCF for said UE, and, since the new information element "user reallocated notification" is received from the S-CSCF, the HSS stores a "user reallocated data mark", indicating that the UE-b has been assigned to a replacement S-CSCF to substitute another S-CSCF that has failed.

14.—Since the UE-b is not currently registered within the IMS, the "filter criteria" received by S-CSCF-2 (i.e. within the "Server-Assignment-Answer", SAA, received on flow 13) dictates to the S-CSCF-2 that, e.g., the received INVITE message towards the UE-b is to be sent to, for example, an application server, which can be a voice mail server attending communications sessions addressed to the UE-b whilst said UE is not registered. That is the example case illustrated by FIG. 10. Then, the S-CSCF-2 forwards the received INVITE message towards the corresponding party, which results to be—according to the illustrated case—the voice mail server assigned to UE-b (the S-CSCF-2 does not include in the SIP INVITE message of flow 14 the "user reallocated notification" that was earlier received from the I-CSCF, since now it is not relevant). The voice mail server, thus will attend the received INVITE message and will e.g. record a voice message issued by UE-a. Although not show in the figure, the S-CSCF-2 sends back towards the I-CSCF positive progress messages indicating that it is currently processing the INVITE message received earlier in flow 9.

A description for accomplishing with the "first reallocation procedure" wherein, according to one embodiment, a telecommunications system comprise an IMS has been disclosed above with reference to FIGS. 7 to 10. As a result of the illustrated embodiment, an according to the illustrated examples, UEs UE-a and UE-b have been reallocated to S-CSCF-2 upon failure of S-CSCF-1. Data stored by the HSS in respect to these reallocated UEs is schematically illustrated in the Table-1 below:

TABLE 1

| User identifiers of the UE | Currently assigned S-CSCF | Reallocated data mark |
|---|---|---|
| UE-a (e.g. a SIP-URI associated to the UE-a or to the user of the UE-a) | S-CSCF-2 (e.g. a SIP-URI of S-CSCF-2) | Set, "1" (e.g. a value "1" if the mark is set, and a default value such as "0" otherwise) |
| UE-b (e.g. a SIP-URI associated to the UE-b or to the user of the UE-b) | S-CSCF-2 (e.g. a SIP-URI of S-CSCF-2) | Set, "1" (e.g. a value "1" if the mark is set, and a default value such as "0" otherwise) |

The corresponding description for accomplishing with the "second reallocation procedure" according to said embodiment shall now be disclosed with reference to FIGS. 11 and 12. The procedures described below take into account if a reallocated data mark is set or not in the HSS for the sake of reallocating the UEs that were earlier reallocated to a S-CSCF during the "first reallocation procedure" back to the most suitable S-CSCF.

FIG. 11 shows a simplified signaling flow illustrating how a UE is reallocated back to a SS when it is re-registers into the IMS, and when it is not involved in an ongoing communication session, according to one embodiment of the invention. In particular, FIG. 11, shows how a UE (e.g. UE-a) that was initially reallocated (by the "first reallocation procedure" disclosed by any of FIGS. 7 to 10) to a certain S-CSCF (e.g. to S-CSCF-2) is reallocated back to another S-CSCF (e.g. to S-CSCF-1).

FIG. 11 flows and processing steps are now described below in respect to its numbered references on the left side of the figure:

1.—A SIP registration message REGISTER is received by the I-CSCF from UE-a.

2.—The I-CSCF, according to the prior art, queries the HSS to obtain, either: an identifier of the S-CSCF currently assigned to the UE-a, or the corresponding SS capabilities to select a suitable S-CSCF to be assigned to the UE-a. According to TS 29.228, the query to the HSS can be sent via DIAMETER protocol message "User-Authorization-Request", UAR.

3, 4.—According to the illustrated example (i.e. re-registration), the HSS finds on its current data that the UE-a is currently registered in the IMS and assigned to S-CSCF-2. Therefore the HSS replies on flow 4 to the I-CSCF with a DIAMETER UAA message containing an identifier of S-CSCF-2. However, the HSS also finds that the UE-a was assigned to the current S-CSCF (i.e. S-CSCF-2) because another S-CSCF had failed (e.g. reallocated data mark in Table 1 above). In other words, the HSS finds that it had stored a "user reallocated data mark" in relationship with any of the identifiers of the UE-a. Therefore, the HSS replies on flow 4 to the I-CSCF with a DIAMETER "User-Authorization-Answer" message, UAA, containing an identifier of S-CSCF-2 and further including a new information element, which has been referred as "user reallocated notification from UDB" and which can be coded within the DIAMETER UAA message in the same manner as the information element (AVP, "User-Reallocated-Notification") described earlier in respect to step 11 of FIG. 7.

An example of the resulting modified DIAMETER message UAA is provided below, wherein the novel information element (AVP) "User-Reallocated-Notification" is highlighted:

```
< User-Authorization-Answer> ::= < Diameter Header: 300, PXY,
    16777216 >
                < Session-Id >
                { Vendor-Specific-Application-Id }
                [ Result-Code ]
                [ Experimental-Result ]
                { Auth-Session-State }
                { Origin-Host }
                { Origin-Realm }
                *[ Supported-Features ]
                [ Server-Name ]
                [ Server-Capabilities ]
                *[ AVP ]
                *[ Failed-AVP ]
                *[ Proxy-Info ]
                *[ Route-Record ]
                [ User-Reallocated-Notification ]
```

The novel information element sent in the DIAMETER UAA message (i.e. the new AVP "User-Reallocated-Notification") makes up an implementation of the "user reallocated notification from UDB" according to this embodiment.

Embodiments related to the coding—and processing—of the new information element "User-Reallocated-Notification" within the UAA message can be as described earlier in respect to step 11 of FIG. 7. In particular, according to a first implementation example, the mere presence of the new AVP "User-Reallocated-Notification" in a UAA message can indicate explicitly to the I-CSCF that the S-CSCF identified therein was assigned to the concerned UE (i.e. UE-a) in substitution of another S-CSCF that failed. Alternatively, the value indicated within the new "User-Reallocated-Notification" in a UAA message can be considered; wherein, for example—according to the previously disclosed example—a value set to "1" indicates that the concerned UE (i.e. UE-a) was assigned to a S-CSCF in substitution of another S-CSCF that failed.

The I-CSCF then, upon reception of the message of flow 4 including the "user reallocated notification from UDB", can proceed to execute flow 9, as described later, wherein the I-CSCF utilizes SS capabilities obtained from the HSS to select a new S-SCSCF to be assigned to the UE-a.

However, according to an embodiment of the invention, the I-CSCF, before utilizing the SS capabilities for selecting a S-CSCF to be assigned to UE-a, establishes further communications with the S-CSCF identified by the UAA message received in flow 4, wherein flows 5 to 8 are executed. Flows and steps 5 to 8 allow the I-CSCF to further proceed—i.e. in flow 9—for selecting a S-CSCF to which the originally reallocated UE-a is to be re-assigned (reallocated back) and, in particular, permits the currently assigned S-CSCF (S-CSCF-2) to determine whether there is any ongoing session for UE-a (either: initiated by said UE, or terminated/addressed to said UE); wherein the new S-CSCF selection to be made by the I-CSCF is only executed if the UE-a is not currently involved in a communication session.

A description of flows and steps 5 to 8 of FIG. 11 for the case wherein there is no ongoing communication session for UE-a with other party, which controlled by its currently assigned S-CSCF (i.e. S-CSCF-2), is provided below. A description of flows and steps in respect to the case wherein there is/are any ongoing communication session for UE-a with other party which is/are controlled by its currently assigned S-CSCF (i.e. S-CSCF-2), shall be provided later with reference to FIG. 12.

5, 6.—The I-CSCF sends the (re)registration message REGISTER received from UE-a to the S-CSCF identified by the HSS (i.e. S-CSCF-2). The REGISTER message sent by the I-CSCF to the S-CSCF-2 further comprises a new information element—herein referred as "user fall back indication"—that is added by the I-CSCF to the SIP REGISTER message received from the UE-a when it received "User-Reallocated-Notification" in the UAA message of the previous flow 4 (i.e. when the I-CSCF received a "user reallocated notification from UDB"). This new information element can be added as a new Uniform Resource Identifier (URI) to the SIP message REGISTER; for example:

sip:s-cscf-2.domain.com;user-fall-back

Thereby, by receiving the new information element above, the receiver S-CSCF (S-CSCF-2) is explicitly informed that, although it is the currently assigned S-CSCF to the concerned UE (UE-a), a new S-SCSCF assignment procedure is to be executed for assigning a S-CSCF to said UE (UE-a). That may result in another S-CSCF to be selected, which might be not—necessarily, or even likely—the S-CSCF-2.

7.—The S-CSCF-2—in order to accomplish with a smooth S-CSCF assignation/fall back for the concerned UE (i.e. UE-a)—checks whether there are ongoing communication sessions controlled by the S-CSCF-2 in respect to UE-a.

8.—According to this example, the S-CSCF-2 determines that there are no ongoing communication sessions controlled by the S-CSCF-2 in respect to UE-a (otherwise, the case is illustrated in FIG. 12, from step 7 onwards). Therefore, it replies to the I-CSCF with a negative response to the REGISTER message received in step 6. Thereby, notifying the I-CSCF that it can feel free to assign any (new) S-CSCF to UE-a. According to the illustrated example, the S-CSCF-2 sends the negative response via a SIP message "480, temporarily unavailable".

Receiving this kind of negative response from a S-CSCF (i.e. as disclosed in respect to FIG. 11 flow 8 above), according to the prior art, allows the I-CSCF to select a new S-CSCF for the concerned UE. Therefore, the embodiment disclosed herein with respect to flows 5 to 8 of FIG. 11 allows accomplishing with embodiments of the invention whilst, at the same time, the implementation impact in the I-CSCF(s) are minimized.

Flows 5 to 8 described above allow a smooth S-CSCF new reallocation of a UE taking into account whether the UE is involved in a communication session. Accordingly, a UE (e.g. UE-a) that was assigned to a certain S-CSCF (e.g. S-CSCF-2) upon a failure detected for the most preferred/suitable S-CSCF to be assigned (e.g. S-CSCF-1), can be assigned back to the most preferred/suitable S-CSCF (e.g. again to S-CSCF-1) when the UE re-registers again into the IMS, and when the UE is not involved in a communication session. Preferably, the S-CSCF-2, upon receiving the REGISTER message of flow 6 comprising the new information element "user fall back indication" (e.g. a SIP message comprising the aforementioned element "sip: s-cscf-2.domain.com; user-fall-back") sets a mark in respect to the session information it holds in respect to the concerned UE-a so that, any future session initiation request message (e.g. SIP INVITE messages) received from UE-a, or addressed to UE-a, are rejected from S-CSCF-2. Thereby, allowing to gracefully move back by the I-CSCF the UE-a to a newly selected S-CSCF without causing any communication service interruption to said UE.

9, 10.—The I-CSCF selects, among the available S-CSCFs and based on the SS capabilities obtained from the HSS (e.g. previously obtained in flow 4, or explicitly requested in step 9—flow not show in FIG. 11 for simplicity), one S-CSCF that can be assigned to UE-a. That results in S-CSCF-1 being selected. Therefore, the received REGISTER message is sent to S-CSCF-1. The REGISTER message sent to the S-CSCF-1 in flow 10 (i.e. as opposed to the REGISTER message sent by the I-CSCF during the "first reallocation procedure"; e.g.: flows #9 in FIGS. 7 to 10) does not contain any "user reallocated indication" information element. This is because the I-CSCF had received on flow 4 above a "user reallocated notification from UDB" from the HSS in respect to the concerned UE-a.

11, 12.—The S-CSCF-1, upon reception of the REGISTER message that does not include a "user reallocated indication" information element, proceeds as in a normal UE registration. That involves sending—on flow 12—a server assignment request including one or more of the received (flow 10) user identifiers of the UE-a, and an identifier of said S-CSCF-1. In an IMS telecommunications system, this is accomplished by sending a DIAMETER message "server assignment request", SAR. Since the S-CSCF-1 did not receive the REGISTER message including a "user reallocated indication" information element, the S-CSCF-1 does not includes "a user reallocated notification from SS" in the SAR message. By sending a SAR message to the HSS that does not includes "a user reallocated notification from SS", the sender S-CSCF (S-CSCF-1 in this case) explicitly ask the HSS to delete any "user reallocated data mark" that might be stored by the HSS in respect to any of the user identifiers of the UE identified by the SAR message.

13, 14.—The HSS, upon receiving a DIAMETER message "server assignment request", SAR from S-CSCF-1 in respect to UE-a proceeds as in the prior art. That comprise, for example and among other, to store an identifier of the S-CSCF-1 in relationship with any of the identifiers of the UE-a (either: user identifiers of the UE-a received in the SAR message, or user identifiers held by the HSS that are stored in relationship with the user identifiers received in the SAR message). The HSS sends back to S-CSCF-1 an acknowledge message (DIAMETER message SAA) in flow 14. However, according to an embodiment of the invention, if the SAR message received from a S-CSCF does not include "a user reallocated notification from SS" information element, the HSS deletes any "user reallocated data mark" that might be stored by the HSS in respect to any of the user identifiers of the UE identified by the SAR message.

According to the example illustrated herein, the data by the HSS in respect to these reallocated UEs (i.e. Table-1, disclosed earlier) gets updated, and it is illustrated by the Table-2 below:

TABLE 2

| User identifiers of the UE | Currently assigned S-CSCF | Reallocated data mark |
| --- | --- | --- |
| UE-a (e.g. a SIP-URI associated to the UE-a or to the user of the UE-a) | S-CSCF-1 (e.g. a SIP-URI of S-CSCF-1) | Clear, "0" (e.g. a value "1" if the mark is set, and a default value such as "0" otherwise) |
| UE-b (e.g. a SIP-URI associated to the UE-b or to the user of the UE-b) | S-CSCF-2 (e.g. a SIP-URI of S-CSCF-2) | Set, "1" (e.g. a value "1" if the mark is set, and a default value such as "0" otherwise) |

Therefore, thereafter, the HSS will reply any query from the I-CSCF that concern to user identifiers of UE-a (e.g. queries received from a I-CSCF via DIAMETER messages UAR or LIR) with an identifier of S-CSCF-1 (i.e. as the currently assigned S-CSCF to UE-a) but will not include in its reply to the I-CSCF a "user reallocated notification from UDB", since the "reallocated data mark" is not set in respect to UE-a. In turn, queries received from the I-CSCF that concern to user identifiers of UE-b will—according to the illustrated example—be replied from the HSS comprising: an identifier of the currently assigned S-CSCF (i.e. S-CSCF-2) and further including a "user reallocated notification from UDB", since the "reallocated data mark" is (still) set in respect to UE-b.

15, 16, 17.—Preferably, the HSS sends a deregistration request message in respect to UE-a to the S-CSCF that was previously assigned to the UE-a; namely to S-CSCF-2 (flow 15). According to TS 29.228, the deregistration request message can be a DIAMETER message "Registration Termination Request", RTR. The receiver S-CSCF-2 then is requested (in step 17) to clear all the information it had in respect to the user identifiers of the UE identified in the RTR message (i.e. UE-a in the example), and to tear down any ongoing communication session currently controlled by the S-CSCF in respect to said UE. However, as described earlier, advantageously, the S-CSCF-2 is not currently handling any communication session in respect to UE-a. Therefore, the S-CSCF-2 can accomplish with the implicit requirement of the RTR message received in flow 15, by clearing all its data about UE-a; which is therefore graceful and smoothly reallocated back to S-CSCF-1 according to the illustrated example. An acknowledge to the received RTR message is sent back to the HSS in flow 17.

18, 19.—A positive acknowledgement to the REGISTER message sent by the UE-a in flow 1 is sent back towards the UE, via the I-CSCF, in flows 18 and 19.

Earlier, in respect to flows and steps 5 to 8 of FIG. 11, it was described a case wherein a UE (UE-a) is newly reallocated back to a S-CSCF (S-CSCF-1) in the case where said UE (UE-a) is not currently involved in a communication session controlled by its currently assigned S-CSCF (i.e. S-CSCF-2). Now, a description shall be given with reference to FIG. 12 on how the I-CSCF and the currently assigned S-CSCF (S-CSCF-2) deal with the situation of the UE-a sending a re-registration message whilst it is involved in a communication session controlled by its currently assigned S-CSCF-2, according to an embodiment of the invention. In particular, said embodiment allows—in combination with the embodiment described earlier in respect to steps 5 to 8 in FIG. 11—to later reallocate back the UE-a to a newly selected S-CSCF in a quick, smooth and graceful manner; without interrupting any communication service that might be currently ongoing in the UE to be (newly) reallocated back to a (newly) selected S-CSCF.

FIG. 12 flows and processing steps are now described below in respect to its numbered references on the left side of the figure:

1 to 6.—The description is the same as previously described in respect to FIG. 11.

7.—The S-CSCF-2—in order to accomplish with a smooth S-CSCF assignation/fall back for the concerned UE (i.e. UE-a)—checks whether there are ongoing communication sessions controlled by the S-CSCF-2 in respect to UE-a. According to this example, the S-CSCF-2 determines that there is at least one communication session (e.g. either: a communication session that was initiated by the UE-a towards another party, or a communication session that was initiated by other party and that was addressed to the UE-a—i.e. to be terminated by the UE-a). The S-CSCF-2 is now aware—by the reception of the REGISTER message in flow 6 that further included the "user fall back indication"— that the UE-a is to be subject of a new S-CSCF reallocation process. Therefore, in order to do not disturb the currently ongoing communication session(s) of the UE-a that are controlled by S-CSCF-2, the S-CSCF-2 determines that the UE-a shall re-register again into the IMS in a shorter time than the one the UE-a had specified on its REGISTER message (i.e. "registration time" indicated in the REGISTER message of flows 1, 6).

8, 9.—A positive response to the SIP REGISTER message is sent back towards the UE-a, via the I-CSCF. The positive response, according to the illustrated embodiment, comprises a SIP 200 OK message. The positive response comprises, according to an embodiment of the invention, a "registration time" shorter than the "registration time" conveyed by the SIP REGISTER message received in flows 1, 6. Preferably, the "registration time" conveyed in the response message (8, 9) is a time substantially lower than the "registration time" conveyed in the request message (1, 6); for example the "registration time" conveyed in the response message (8, 9) comprises a value indicating a half of the "registration time" value received in the REGISTER message (1, 6).

10.—The UE-a, receives an acknowledge to its previously sent REGISTER message requesting a re-registration in the IMS (i.e. flow 1). The acknowledge message (flow 9) comprises a "registration time" that the UE shall obey for requesting a subsequent re-registration message to the IMS and, thus, for sending later a REGISTER message (i.e. as in flow 1).

11.—The UE-a will then, subsequently (i.e. according to the—shortened registration time received in flow 9), send later a new REGISTER message (not illustrated in the FIG. 12) in order to re-register within the IMS. Said REGISTER message will be processed by the I-CSCF, by the HSS and by the currently assigned S-CSCF, as described in respect to this figure (FIG. 12), or as described earlier in respect to FIG. 11. In other words: if the REGISTER message from UE-a is received whilst it is involved in a communication session, it will be replied with a positive response (e.g. FIG. 12, flows 8, 9) comprising a "registration time" that is shorter than the "registration time" requested by the UE on the REGISTER message. Otherwise, if the REGISTER message from UE-a is received whilst it is not involved in a communication session, the UE-a shall be (re)allocated to a S-CSCF as described earlier in FIG. 11.

Further implementation aspects for accomplishing with any of the servers described hereinbefore (i.e. IS, SS and UDB servers) is provided below with reference to FIGS. 13 to 16.

Figure 13:
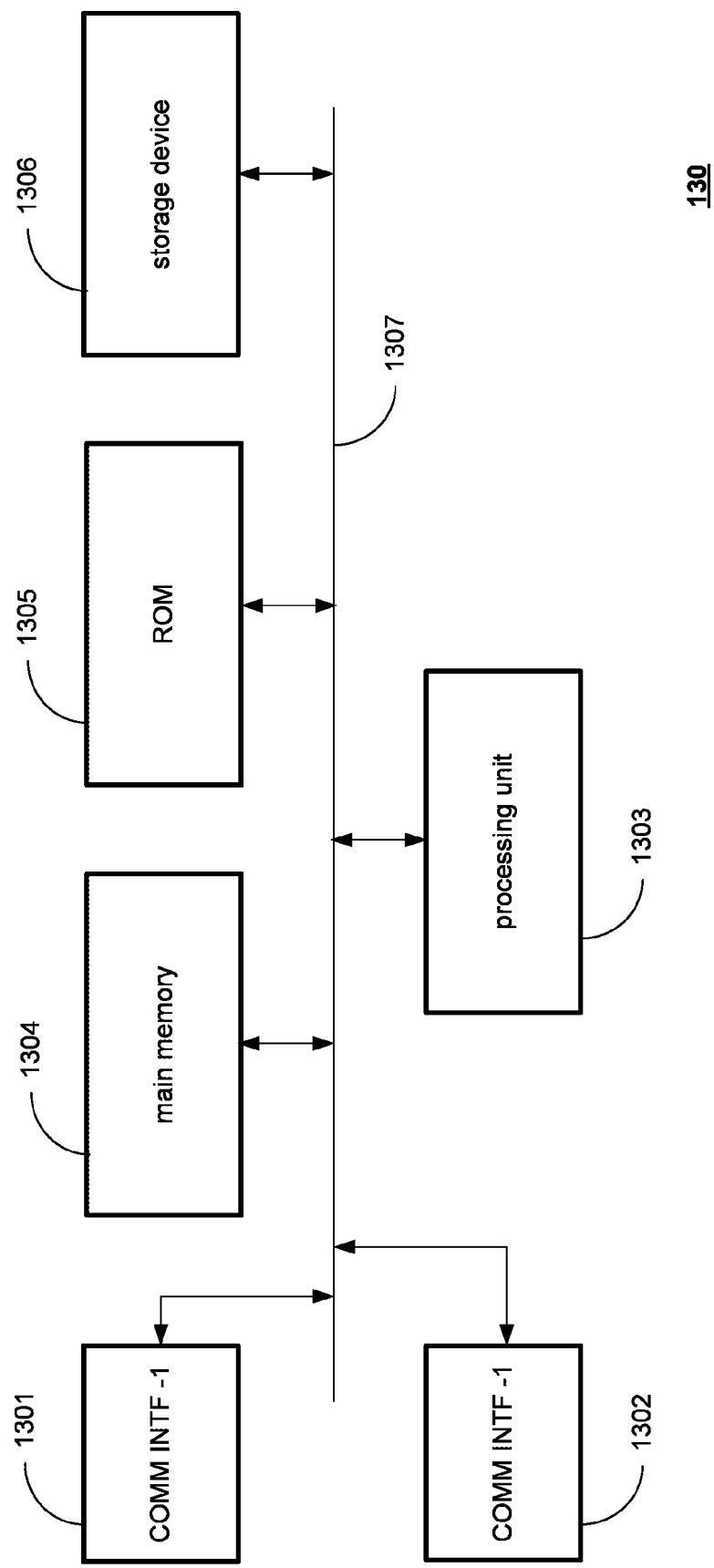
FIG. 13 shows a schematic diagram of an exemplary implementation of a server according to one embodiment of the invention.

FIG. 13 shows a schematic diagram of an exemplary implementation of a server (130) according to one embodiment of the invention. The server (130) can be an interrogating server (IS, I-CSCF), or a service server (SS, S-CSCF), or a database server (UDB, HSS). As illustrated, the server 130 comprises: one or more communication interface units (1301, 1302), a main memory (1304), a ROM (1305), a storage device (1306), a processing unit (1303), and a communication bus (1307) allowing these physical elements (1301 to 1306) to communicate to each other. According to this embodiment, any of the storage means (e.g. 1304, 1305 or 1306) can comprise computer-executable instructions configured, when carried out by e.g. the processing unit (1303) of the server (130), to allow: a server (130) configured as a IS server to execute any of the steps described earlier with reference to FIG. 4, a server (130) configured as a SS server to execute any of the steps described earlier with reference to FIG. 5, and a server (130) configured as a UDB server to execute any of the steps described earlier with reference to FIG. 6.

The communication interface units (1301, 1302) include one or more transceivers that allow the server (130) to communicate with other servers. For example, a first communication interface unit (e.g. 1301) can be configured to exchange communication messages with other entities/server/apparatuses via SIP protocol, and a second communication unit can be configured to exchange communication messages with other entities/server/apparatuses via DIAMETER protocol. The processing unit (1304) may include one or more processors configured to interpret and execute computer instructions stored by any of the storage means (e.g. 1304, 1305 or 1306). The main memory (1304) may include a RAM memory, or another type of dynamic storage device, configured to store information and instructions for executing by the processing unit (1303). The ROM storage (1305) may include read-only memory devices, or another type of static storage device that may store static information and instructions for executing by the processing unit (1303). The storage device (1306) may include a magnetic and/or optical recording medium and its corresponding drive.

The server 130 may perform certain operations or processes described herein. These operations may be performed in response to processing unit 1303 executing software instructions contained in a computer-readable medium, such as main memory 1304, ROM 1305, and/or storage device 1306. A computer-readable medium may be defined as a physical or a logical memory device. For example, a logical memory device may include memory space within a single physical memory device or distributed across multiple physical memory devices (1304, 1305, 1306). Each of main memory 1304, ROM 1305 and storage device 1306 may include computer-readable media. The software instructions may be read into main memory (1304) from another computer-readable medium, such as storage device 1306, or from another device via any available communication interface (1301, 1302).

The software instructions executed by the processing unit 1303 cause the server (130) to perform the operations and process described herein. Alternatively, hardwired circuitry may be used in place of or in combination with software instructions to implement processes and/or operations described herein. Thus, implementations described herein are not limited to any specific combination of hardware and software. In particular, the software—or hardwired circuitry—for a server 130 configured as an interrogating server IS (e.g. as an I-CSCF) are preferably configured for making the apparatus implementing the IS server to execute the steps of the "first reallocation IS procedure" (S1100), and the steps of the "second reallocation IS procedure". In particular, the software—or hardwired circuitry—for a server 130 configured as an interrogating server SS (e.g. as an S-CSCF) are preferably configured for making the apparatus implementing the SS server to execute the steps of the "first reallocation SS procedure" (S1200), and the steps of the "second reallocation SS procedure" (2200). In particular, the software—or hardwired circuitry—for a server 130 configured as a database server UDB (e.g. as an HSS) are preferably configured for making the apparatus implementing the UDB server to execute the steps of the "first reallocation UDB procedure" (S1300), and the steps of the "second reallocation UDB procedure" (2300).

Accordingly, an embodiment for accomplishing with the solutions provided by the invention comprise one or more computer programs comprising program computer-executable instructions configured when carried out on one or more servers—such as: an IS server, a SS server, or a UDB server—to execute by the one or more servers any of the procedures described earlier. The one or more computer programs can be stored in a—e.g. non-transitory storage—medium (e.g. 1306).

Figure 14:
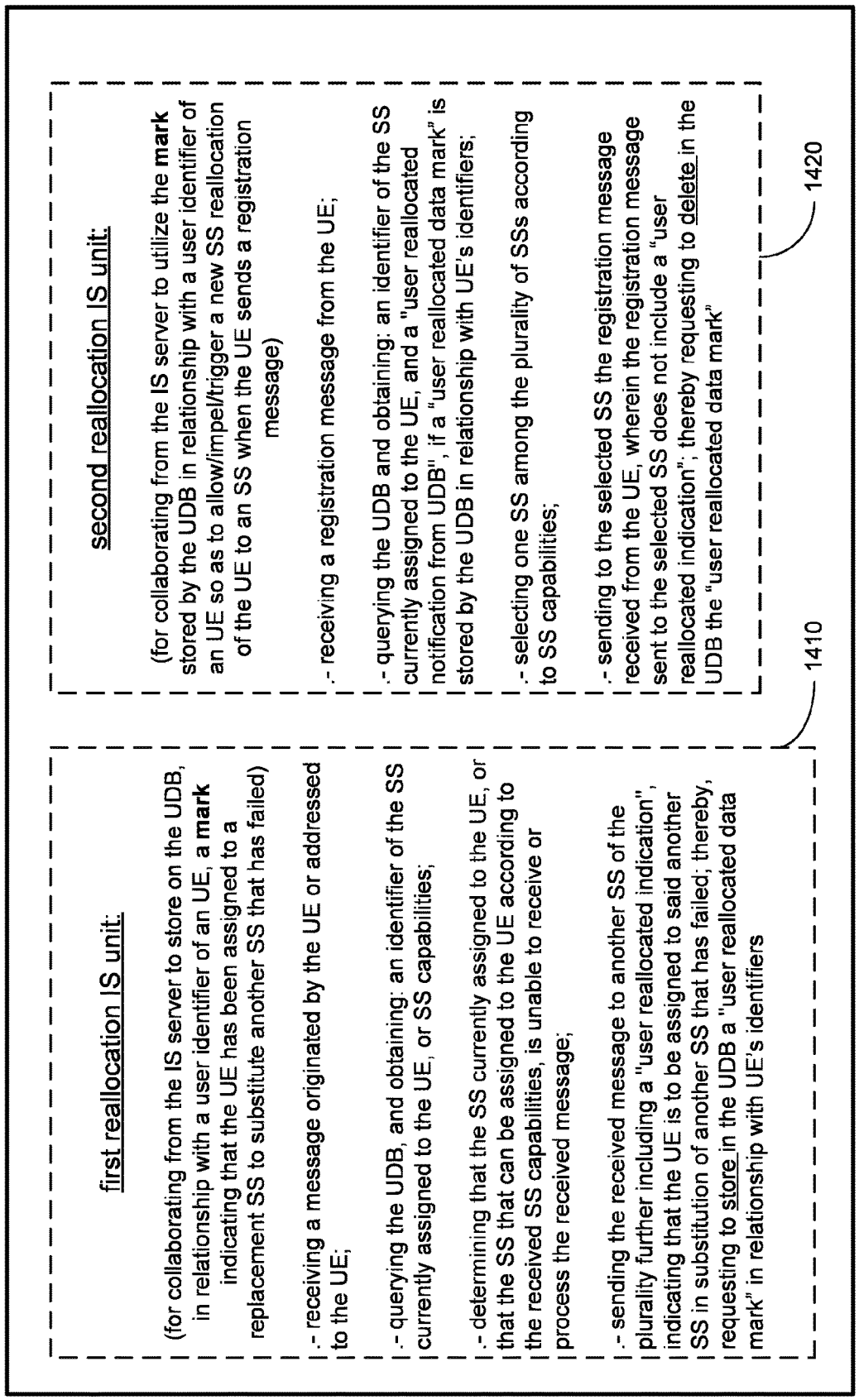
FIGS. 14 to 16 schematically illustrate IS, SS, and UDB servers according to one embodiment of the invention.

FIG. 14 schematically illustrate an IS server (140) according to one embodiment of the invention. The IS server 140 illustrated on FIG. 14 may for example be implemented as illustrated on FIG. 13.

The IS server (140) comprises a first reallocation IS unit (1410) and a second reallocation IS unit (1420). The first reallocation IS unit 1410 is configured for cooperating with the SSs (150) and with the UDB (160) for the sake of storing by the UDB of a "mark", in relationship with an identifier of a UE, indicating that said UE has been assigned to a replacement SS in substitution of another SS that has failed. The second reallocation IS unit 1420 is configured for cooperating with the SSs (150) and with the UDB (160) to utilize the existence of said "mark" for the sake of reallocating the UE to an SS when the UE sends—e.g. afterwards—a registration message.

According to the illustrated embodiment, the first reallocation IS unit 1410 is configured to: receive a message from the UE or addressed to the UE including one or more user identifiers, query the UDB and obtaining—as a result of said query—an identifier of the SS currently assigned to the UE or SS capabilities, and determine that the SS currently assigned to the UE, or that the SS that can be assigned to the UE according to the SS capabilities received from the UDB, is unable to receive or process the received message, and send the received message to another SS of the plurality—herein referred to as "replacement SS"—further including an information element—herein referred to as "user reallocated indication"—, indicating that the UE is to be assigned to said replacement SS in substitution of another SS that has failed; thereby asking the replacement SS to request the UDB to store, in relationship with at least one of the user identifiers: an identifier of said replacement SS as the currently assigned SS, and a data—herein referred as "user reallocated data mark"—indicating that the UE has been assigned to a replacement SS to substitute another SS that has failed.

According to the illustrated embodiment, the second reallocation IS unit 1420 is configured to: receive a registration message from the UE including one or more user identifiers, query the UDB and obtaining—as a result of said query—an identifier of the SS currently assigned to the UE and an information element—herein referred to as "user reallocated notification from UDB"—if a user reallocated data mark is stored by the UDB in relationship with at least one of the user identifiers, select one SS among the plurality of SSs according to SS capabilities, and send to the selected SS the registration message received from the UE, wherein the registration message sent to the selected SS does not include a user reallocated indication; thereby asking the selected SS to request the UDB to store, in relationship with at least one of the user identifiers, an identifier of said selected SS as the currently assigned SS, and to delete the user reallocated data mark.

According to an embodiment (not illustrated in FIG. 14), the second reallocation IS unit is further configured for, when a user reallocated notification from UDB is received, determining that the SS identified by the UDB as the SS currently assigned to the UE rejects to process the received registration message, and then selecting one SS among the plurality of SSs according to SS capabilities. According to this embodiment, the second reallocation IS unit is further configured for determining that the identified SS rejects to process the received registration message by: (first) sending to the identified SS the received registration message further including an information element, hereinafter referred to as "user fall back indication", indicating that the UE was assigned to said SS in substitution of another SS that failed, and (second) by receiving a negative response from the identified SS indicating an unavailability condition of said SS to process said registration message.

Figure 15:
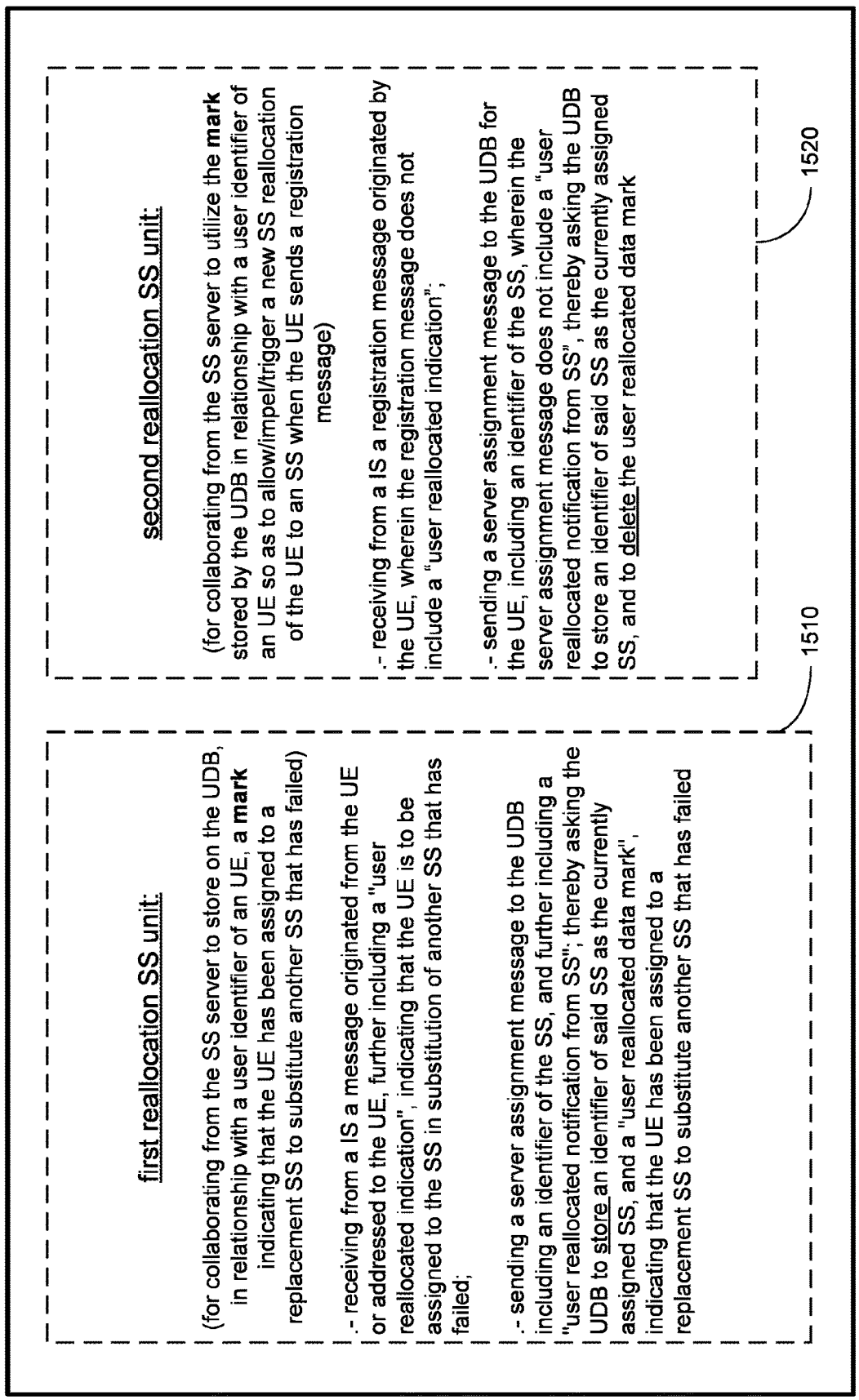

FIG. 15 schematically illustrate a SS server (150) according to one embodiment of the invention. The SS server 150 illustrated on FIG. 15 may for example be implemented as illustrated on FIG. 13.

The SS server (150) comprises a first reallocation SS unit (1510) and a second reallocation IS unit (1520). The first reallocation SS unit 1510 is configured for cooperating with the IS (140) and with the UDB (160) for the sake of storing by the UDB of a "mark", in relationship with an identifier of a UE, indicating that said UE has been assigned to a replacement SS in substitution of another SS that has failed. The second reallocation SS unit 1520 is configured for cooperating with the IS (140) and with the UDB (160) to utilize the existence of said "mark" for the sake of reallocating the UE to an SS when the UE sends—e.g. afterwards—a registration message. It is apparent from the description that not necessarily all the SSs of a telecommunication system need to be configured with the first reallocation SS unit (1510) and also with the reallocation SS unit (1520), as described herein, but that preferably at least 2 or more of any of the of the SSs of a telecommunication system are preferably configured with at least one or with both of said first and second reallocation unit; thereby allowing a (simple) case wherein a UE is reallocated to a second SS upon a failure of a first SS, and wherein the UE is reallocated back to the first SS.

According to the illustrated embodiment, the first reallocation SS unit 1510 is configured to: receive from the IS a message originated by the UE or addressed to the UE including one or more user identifiers, and further including an information element—herein referred to as "user reallocated indication"—indicating that the UE is to be assigned to said SS in substitution of another SS that has failed, and to send a server assignment message to the UDB including an identifier of said SS, one or more user identifiers included in the received message, and further including an information element—herein referred to as "user reallocated notification from SS"—, if the message received by the SS included a user reallocated indication; thereby asking the UDB to store, in relationship with at least one of the user identifiers: an identifier of said SS as the currently assigned SS for said UE, and a data, hereinafter as "user reallocated data mark", indicating that the UE has been assigned to a replacement SS to substitute another SS that has failed.

According to the illustrated embodiment, the second reallocation SS unit 1520 is configured to: receive from the IS a registration message originated by the UE including one or more user identifiers, wherein the registration message received from the IS does not include a "user reallocated indication", and to subsequently send a server assignment message to the UDB including an identifier of said SS and one or more user identifiers included in the received message, wherein said server assignment message does not include a "user reallocated notification from SS"; thereby asking the UDB to store, in relationship with at least one of the user identifiers, an identifier of said SS as the currently assigned SS for said UE, and to delete the user reallocated data mark.

According to an embodiment (not illustrated in FIG. 15), the second reallocation SS 1520 unit is further configured for: receive from the IS a registration message originated by the UE including one or more user identifiers, and further including an information element—herein referred to as "user fall back indication"—indicating that the UE was assigned to said SS in substitution of another SS that failed, and, either:
  send a negative response message to the IS indicating an unavailability condition of said SS to process said registration message if there is an ongoing communication session controlled by the SS in respect to the UE, or
  send a positive response message to the IS indicating the availability of said SS to process said registration message if there is not an ongoing communication session controlled by the SS in respect to the UE.

According to said embodiment, if there is not an ongoing communication session controlled by the SS in respect to the UE, the second reallocation SS unit is further configured to send the positive response to the IS including a registration time shorter than the requested registration time.

Figure 16:
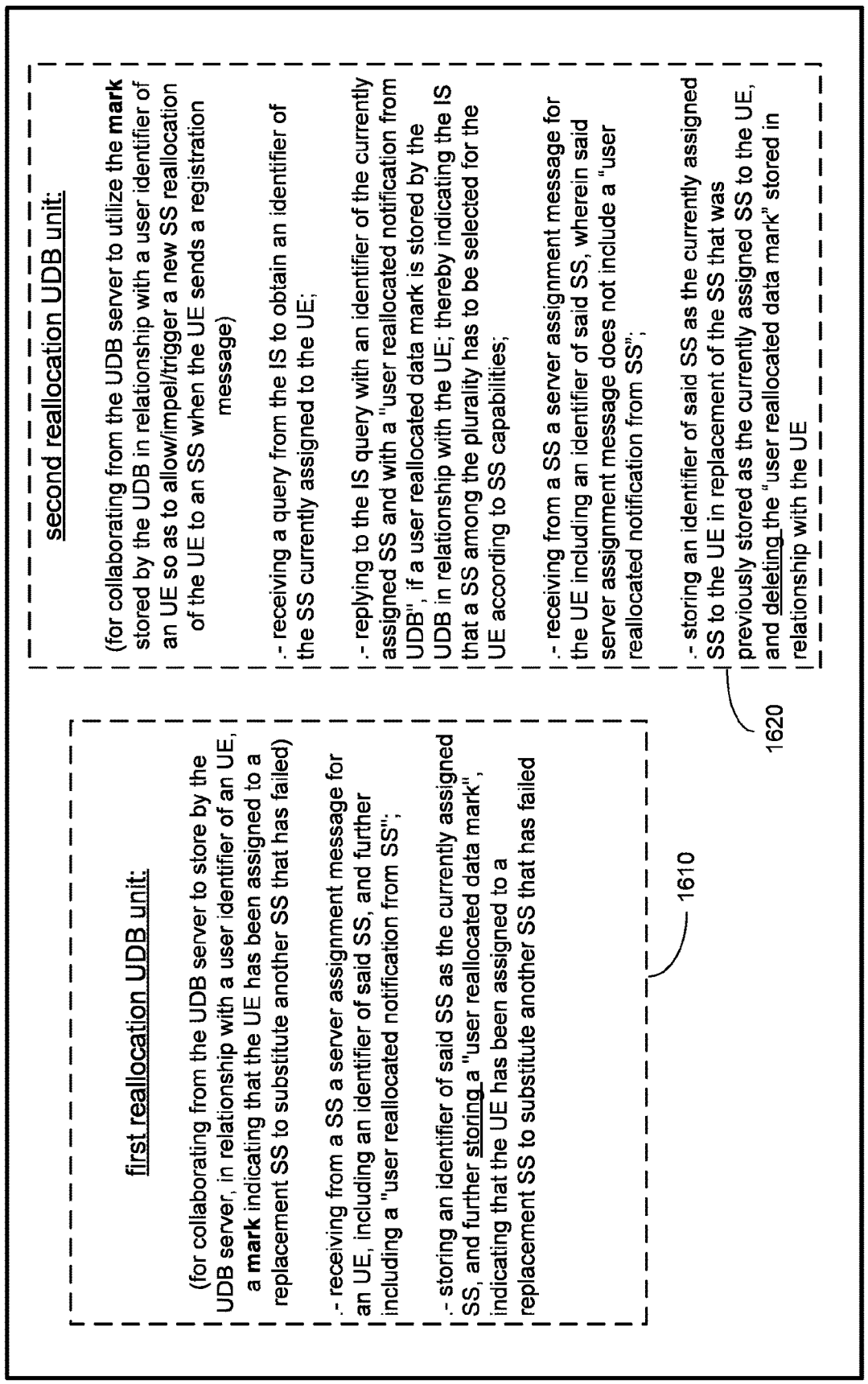

FIG. 16 schematically illustrate a UDB server (160) according to one embodiment of the invention. The UDB server 150 illustrated on FIG. 16 may for example be implemented as illustrated on FIG. 13.

The UDB server (160) comprises a first reallocation UDB unit (1610) and a second reallocation UDB unit (1620). The first reallocation UDB unit 1610 is configured for cooperating with the IS (140) and with one or more SSs (150) for the sake of storing by the UDB of a "mark", in relationship with an identifier of a UE, indicating that said UE has been assigned to a replacement SS in substitution of another SS that has failed. The second reallocation UDB unit 1620 is configured for cooperating with the IS (140) and with the one or more SSs (160) to utilize the existence of said "mark" for the sake of reallocating the UE to an SS when the UE sends—e.g. afterwards—a registration message.

According to the illustrated embodiment, the first reallocation UDB unit 1610 is configured to: receive from a SS a server assignment message including an identifier of said SS, one or more user identifiers, and further including an information element—herein referred to as "user reallocated notification from SS"—, and store, in relationship with at least one of the user identifiers: an identifier of said SS as the currently assigned SS, and a data—herein referred to as "user reallocated data mark"—indicating that the UE has been assigned to a replacement SS to substitute another SS that has failed.

According to the illustrated embodiment, the second reallocation UDB unit 1620 is configured to: receive a query from the IS to obtain an identifier of the SS currently assigned to the UE including one or more user identifiers, and reply to the IS query with an identifier of the currently assigned SS and with an information element—herein referred to as "user reallocated notification from UDB"—if a user reallocated data mark was stored by the UDB (i.e. at the time the query from the IS was received) in relationship with at least one of the user identifiers received on the query from the IS (or stored by the UDB in relationship with any user identifier stored in relationship with any of the received user identifiers)—thereby indicating the IS that a SS among the plurality has to be selected for the UE according to SS capabilities-, receive from a SS a server assignment message including an identifier of said SS and one or more user identifiers, wherein said server assignment message does not include a user reallocated notification from SS, and then store, in relationship with at least one of the user identifiers, an identifier of said SS as the currently assigned SS in replacement of the SS that was stored as the currently assigned SS, and deleting the user reallocated data mark stored in relationship with any of the user identifiers.

According to an embodiment (not illustrated in FIG. 16), the second reallocation UDB unit 1620 is further configured—wherein the server assignment message does not include a user reallocated notification from SS, and wherein a user reallocated data mark was previously stored in relationship with at least one of the user identifiers—for sending a deregistration request message to the SS that was stored as the currently assigned SS including one or more user identifiers.

Any one of the above-referenced first or second reallocation units of an IS, an SS, or a UDB may be implemented in hardware, software, field-programmable gate arrays (FPGAs), application-specific integrated circuit (ASICs), firmware or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method for a node for assigning a wireless device to one of a plurality of service servers after the wireless device was reassigned from a first service server to a second service server and after a user relocation indication of the reassignment was stored at a database, the first and second service servers being included in the plurality of service servers, the method comprising:
  receiving a registration message one of:
    from the wireless device; and
    addressed to the wireless device;
  in response to the registration message, querying for the user relocation indication;
  selecting one of the plurality of service servers for assignment of the wireless device to one of the plurality of service servers based on the user relocation indication; and
  sending, to the selected one of the plurality of service servers, the registration message without modifying the registration message to include the user reallocated indication, the omission of the user reallocated indication in the registration message configured to act as a request for the selected one of the plurality of service servers to perform at least one function.

2. The method of claim 1, further comprising:
requesting that the database store, in relation with a user identifier associated with the wireless device, a service server identifier of the selected one of the plurality of service servers as an assigned service server; and
clearing the user relocation indication stored at the database.

3. The method of claim 1, wherein the selected one of the plurality of service servers is the first service server.

4. The method of claim 1, further comprising receiving a negative response from the selected one of the plurality of service servers indicating an unavailability of the selected one of the plurality of service servers to process the registration message.

5. The method of claim 1, wherein the node is an Interrogating-Call Session Control Function, I-CSCF, node in an Internet Protocol Multimedia Subsystem, IMS.

6. The method of claim 1, wherein the registration message is a Session Initiation Protocol, SIP, message; and
the querying of the user relocation indication including querying the database by sending a DIAMETER protocol message.

7. The method of claim 1, wherein the user relocation indication indicates that one of the first service server failed to respond to a message within a predetermined period of time and failed to process the message.

8. The method of claim 1, wherein the selecting of one of the plurality of service servers for assignment to the wireless device to one of the plurality of service servers is performed based on at least one predefined service server capability that is required for a service server to be assigned to the wireless device; and
the at least one predefined service server capability that is required for a service server to be assigned to the wireless device includes at least one of a capability for performing an authentication mechanism and a capability for service prioritization.

9. The method of claim 1, further comprising querying the database for a service server identifier associated with a service server assigned to the wireless device.

10. The method of claim 1, wherein the user relocation indication indicates the wireless device is assigned to a replacement service server to substitute for another service server that failed.

11. A node for assigning a wireless device to one of a plurality of service servers after the wireless device was reassigned from a first service server to a second service server and after a user relocation indication of the reassignment was stored at a database, the first and second service servers being included in the plurality of service servers, the node comprising:
a processor and a memory, the memory including instructions that, when executed by the processor, configure the node to:
receive a registration message one of:
from the wireless device; and
addressed to the wireless device;
in response to the registration message, query for the user relocation indication;
select one of the plurality of service servers for assignment of the wireless device to one of the plurality of service servers based on the user relocation indication; and
send, to the selected one of the plurality of service servers, the registration message without modifying the registration message to include the user reallocated indication, the omission of the user reallocated indication in the registration message configured to act as a request for the selected one of the plurality of service servers to perform at least one function.

12. The node of claim 11, wherein the memory includes further instructions that, when executed by the processor, configure the node to:
request that the database store, in relation with a user identifier associated with the wireless device, a service server identifier of the selected one of the plurality of service servers as an assigned service server; and
clear the user relocation indication stored at the database.

13. The node of claim 11, wherein the selected one of the plurality of service servers is the first service server.

14. The node of claim 11, wherein the memory includes further instructions that, when executed by the processor, configure the node to receive a negative response from the selected one of the plurality of service servers indicating an unavailability of the selected one of the plurality of service servers to process the registration message.

15. The node of claim 11, wherein the node is an Interrogating-Call Session Control Function, I-CSCF, node in an Internet Protocol Multimedia Subsystem, IMS.

16. The node of claim 11, wherein the registration message is a Session Initiation Protocol, SIP, message; and
the querying of the user relocation indication including querying the database by sending a DIAMETER protocol message.

17. The node of claim 11, wherein the user relocation indication indicates that one of the first service server failed to respond to a message within a predetermined period of time and failed to process the message.

18. The node of claim 11, wherein the selecting of one of the plurality of service servers for assignment to the wireless device to one of the plurality of service servers is performed based on at least one predefined service server capability that is required for a service server to be assigned to the wireless device; and
the at least one predefined service server capability that is required for a service server to be assigned to the wireless device includes at least one of a capability for performing an authentication mechanism and a capability for service prioritization.

19. The node of claim 11, wherein the memory includes further instructions that, when executed by the processor, configure the node to query the database for a service server identifier associated with a service server assigned to the wireless device.

20. A method for a node for assigning a wireless device to one of a plurality of service servers after the wireless device was reassigned from a first service server to a second service server and after a user relocation indication of the reassignment was stored at a database, the first and second service servers being included in the plurality of service servers, the method comprising:
receiving a registration message associated with the wireless device;
triggering a selection of one of the plurality of service servers for assignment of the wireless device to one of the plurality of service servers based at least in part on the registration message; and
sending, to the selected one of the plurality of service servers, the registration message without modifying the registration message to include a user reallocated indication, the omission of the user reallocated indication in the registration message configured to act as a request for the selected one of the plurality of service servers to clear the user relocation indication at the database.

* * * * *